(12) United States Patent
Lincoln

(10) Patent No.: US 9,863,452 B1
(45) Date of Patent: Jan. 9, 2018

(54) ATTACHING OBJECTS MADE OF DISSIMILAR MATERIALS

(71) Applicant: Timothy Martin Lincoln, Gonzales, CA (US)

(72) Inventor: Timothy Martin Lincoln, Gonzales, CA (US)

( * ) Notice: Subject to any disclaimer, the term of this patent is extended or adjusted under 35 U.S.C. 154(b) by 410 days.

(21) Appl. No.: 14/719,484

(22) Filed: May 22, 2015

(51) Int. Cl.
F16B 5/00 (2006.01)
F16B 5/12 (2006.01)

(52) U.S. Cl.
CPC .................... F16B 5/123 (2013.01)

(58) Field of Classification Search
CPC ........... F16B 5/123; F16B 5/125; F16G 11/12
USPC ......................................................... 403/230
See application file for complete search history.

(56) References Cited

U.S. PATENT DOCUMENTS

| | | | | | |
|---|---|---|---|---|---|
| 2,147,437 | A | * | 2/1939 | Gross | A47C 7/002 248/440 |
| 2,908,956 | A | * | 10/1959 | Brazik | F16B 5/125 24/290 |
| 3,354,597 | A | * | 11/1967 | Meyer | F16B 5/123 24/297 |
| 3,432,132 | A | * | 3/1969 | Thurston | A47B 3/04 108/154 |
| 3,806,265 | A | * | 4/1974 | Hattan | F16B 7/06 403/320 |
| 4,079,556 | A | * | 3/1978 | Luck | E04G 21/26 52/127.2 |
| 6,161,339 | A | * | 12/2000 | Cornett, Sr. | E04B 7/02 52/223.13 |
| 9,456,683 | B2 | * | 10/2016 | Price | A47B 3/06 |

* cited by examiner

Primary Examiner — Benjamin F Fiorello
(74) Attorney, Agent, or Firm — Ash Tankha; Lipton, Weinberger & Husick

(57) ABSTRACT

A method for attaching a first object of a first material to one or more second objects of dissimilar second materials without any bonding material is provided. Anchoring elements are positioned at opposing sections of the first object. A tension assembly is positioned substantially at a mid-section between the opposing sections on a rear surface of the first object. One or more tension bearing members are connected to one or more second objects positioned at one or more of the opposing sections on a front surface and/or the rear surface of the first object, via the anchoring elements. Front ends of the tension bearing members extending at the opposing sections on the rear surface of the first object are operably connected to the tension assembly. The tension assembly generates a tension in the extended tension bearing members to attach the objects made of dissimilar materials to each other.

34 Claims, 16 Drawing Sheets

ATTACHING OBJECTS MADE OF DISSIMILAR MATERIALS

BACKGROUND

There are various challenges involved in attaching and constraining objects made of dissimilar materials to each other. Tiling is one of the methods for attaching objects, for example, tiles to a surface such as a wall for various purposes. Tiling is typically used for covering wall surfaces, constructing standalone structures to support loads, for partitioning structures, for ornamental purposes, etc. There are many tiling practices for attaching adjacent tiles to each other. Conventionally, tiles are attached using a bonding material, for example, glue, adhesives, mortar, etc., where a gap between each adjacent tile is filled with the bonding material. The assembly of the adjacent tiles forms a tile assembly that is primarily strengthened by the bonding material. Over time, due to a change in climate, a corrosive environment, or variable loads, the tile assembly may lose strength due to a change in the properties of the bonding material. Replacing the bonding material or clipping the tiles by mechanical means could damage the tile assembly or mar the aesthetic appearance of the tile assembly.

Hence, there is a long felt but unresolved need for a method and an attachment apparatus for attaching a first object made of a first material to one or more second objects made of multiple second materials that are dissimilar to the first material of the first object, without using any bonding material and without damaging the surface and aesthetic appearance of the first object.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method disclosed herein addresses the above stated needs for attaching a first object made of a first material to one or more second objects made of multiple second materials that are dissimilar to the first material of the first object, without using any bonding material and without damaging the surface and aesthetic appearance of the first object. The method disclosed herein comprises assembling an attachment apparatus and attaching one or more second objects made of multiple second materials dissimilar to a first material of a first object, to a front surface and/or a rear surface of the first object made of the first material using the assembled attachment apparatus. The attachment apparatus comprises anchoring elements, a tension assembly, and at least two tension bearing members. The anchoring elements are positioned at opposing sections of the first object made of the first material. The anchoring elements are configured to anchor the tension bearing members on the first object. One or more of the tension bearing members are connected to one or more second objects made of second materials dissimilar to the first material of the first object, positioned at one or more of the opposing sections on the front surface and/or the rear surface of the first object, via the anchoring elements. The tension bearing members are extended at the opposing sections on the rear surface of the first object and front ends of the extended tension bearing members are operably connected to the tension assembly. The tension assembly is positioned substantially at a mid-section between the opposing sections on the rear surface of the first object. The tension assembly is configured to operably connect the extended tension bearing members to generate a tension in the extended tension bearing members, thereby attaching the front surface and/or the rear surface of the first object made of the first material to the second objects made of the second materials dissimilar to the first material of the first object without any bonding material.

In an embodiment, the second objects comprise a set of constrained assemblies made of a second material different from the first material of the first object. The constrained assemblies are positioned below the tension bearing members extending from the anchoring elements positioned at the opposing sections of the first object and are constrained by the extended tension bearing members at the opposing sections on the rear surface of the first object. In an embodiment, the constrained assemblies facilitate attachment of adjacent objects.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
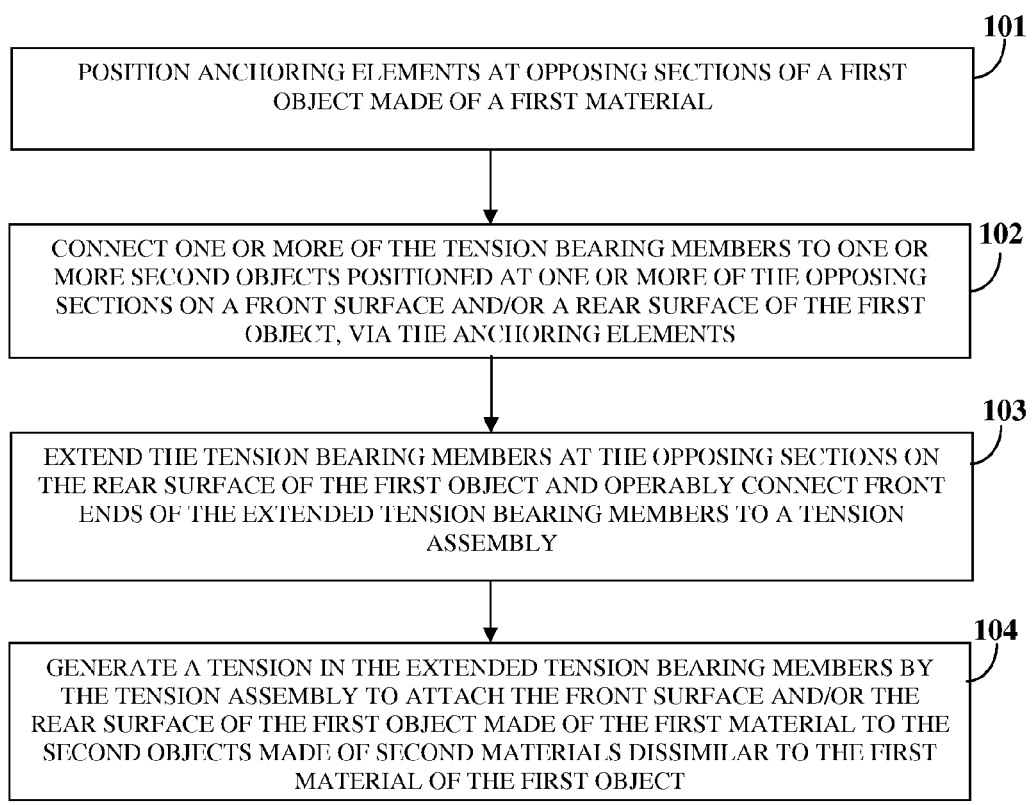
FIG. 1 illustrates a method for attaching a first object made of a first material to one or more second objects made of multiple second materials dissimilar from the first material of the first object without any bonding material.
Figure 2A:
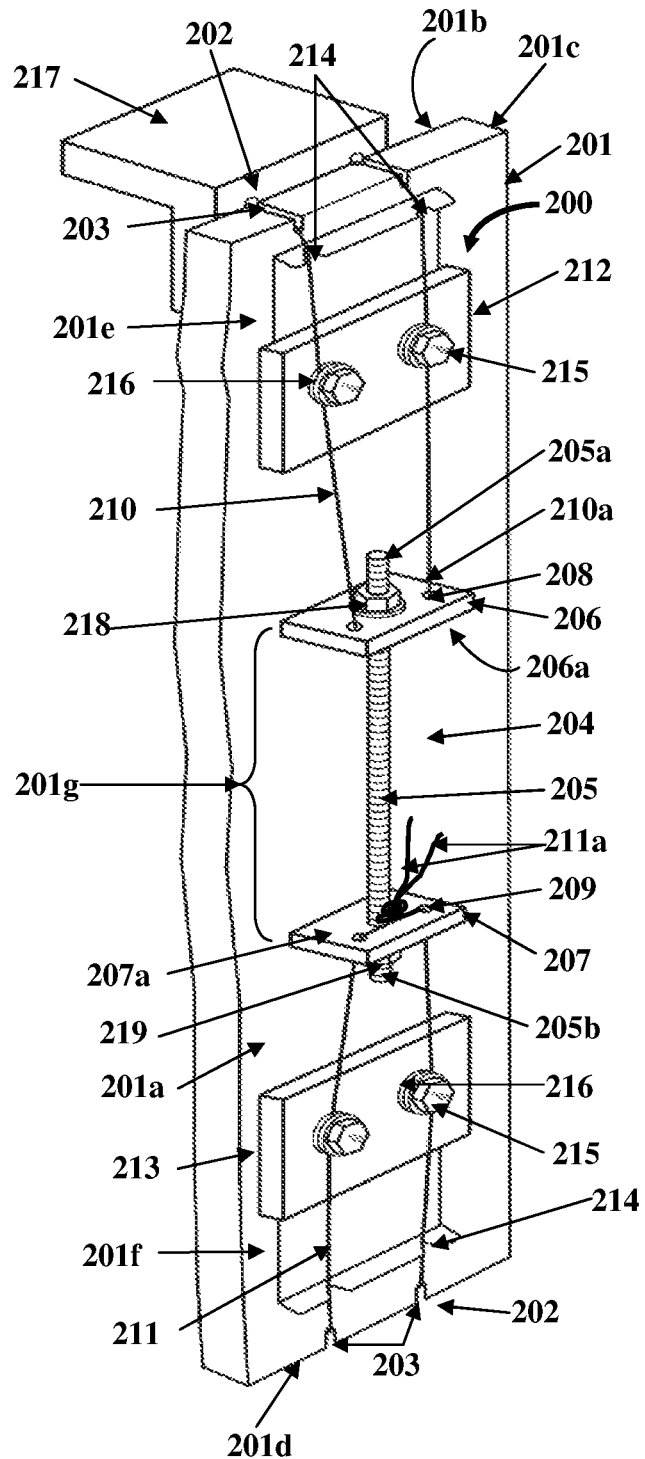
FIG. 2A exemplarily illustrates a rear perspective view showing an attachment apparatus positioned on a rear surface of a first object, and one or more second objects comprising, for example, a supplementary object and a set of constrained assemblies attached to a front surface and a rear surface of the first object respectively, using the attachment apparatus.
Figure 2B:
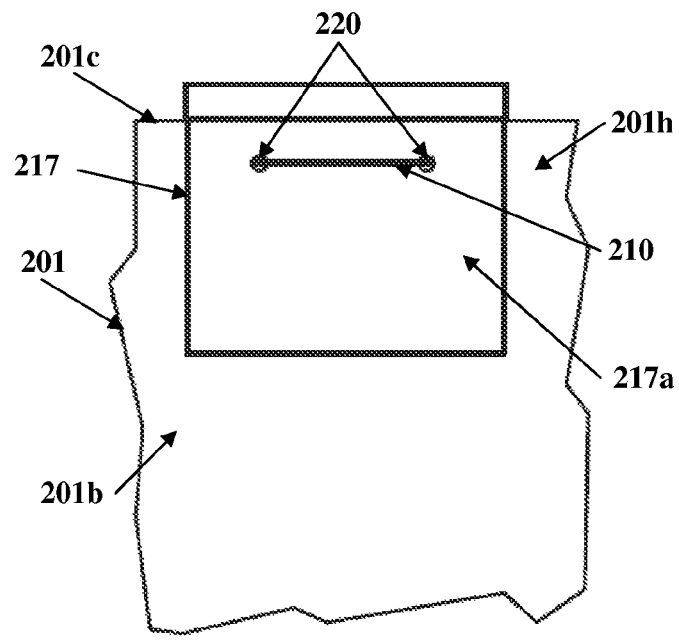
FIG. 2B exemplarily illustrates a partial front elevation view showing a second object, for example, a supplementary object attached to a front surface of a first object via a tension bearing member looped through the second object.
Figure 2C:
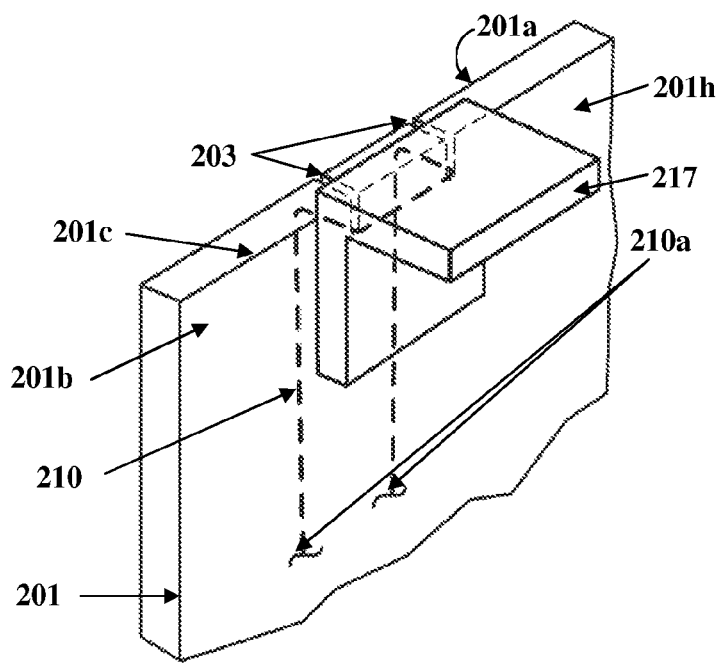
FIG. 2C exemplarily illustrates a partial front perspective view showing a second object, for example, a supplementary object attached to a front surface of a first object via a tension bearing member looped through the second object.

FIG. 1 illustrates a method for attaching a first object 201 exemplarily illustrated in FIGS. 2A-2C, made of a first material to one or more second objects, for example, constrained assemblies 212 and 213, a supplementary object 217 such as an L shaped bracket, etc., exemplarily illustrated in FIGS. 2A-2C, made of multiple second materials dissimilar from the first material of the first object 201 without any bonding material, for example, adhesives, chemical bonding materials, etc. As used herein, "first object" refers to any tangible article or item made of a first material, for example, a tile, a block, a pipe, etc., that can be attached to another object made of a second material similar or dissimilar to the first material. The first object 201 is, for example, a flat object, a cylindrical object, or any object having a constant surface geometry. In an embodiment, the attachment apparatus 200 exemplarily illustrated in FIG. 2A, FIG. 3, FIG. 4A, and FIG. 6A, can be used on a cylindrical object (not shown) having a constant surface geometry. As used herein, "constant surface geometry" refers to a geometry where a surface is constant and uniform and does not have abrupt protrusions that preclude mounting of the attachment apparatus 200 on the surface. The first material of the first object 201 can be, for example, metal, wood, ceramic, stone, etc.

Also, as used herein, "second object" refers to any tangible article, item, or external member made of a second material, that can be attached to a front surface 201b and/or a rear surface 201a of a first object 201 such as a tile made of a first material dissimilar to the second material of the second object exemplarily illustrated in FIG. 2A, using the attachment apparatus 200 disclosed herein. For example, a supplementary object 217 such as an L shaped bracket made of a second material dissimilar to a first material of the first object 201, is attached to the front surface 201b of the first object 201, and a set of constrained assemblies 212 and 213 made of a second material dissimilar to the first material of the first object 201, is attached to the rear surface 201a of the first object 201, without marring the front surface 201b and the rear surface 201a of the first object 201 as exemplarily illustrated in FIGS. 2A-2C. The supplementary object 217 can be, for example, a bracket, or a handle, or a hinge, etc., or any combination thereof. The second material of the second object, for example, the supplementary object 217 can be, for example, metal, wood, ceramic stone, etc., that is dissimilar to the first material of the first object 201. Also, as used herein, "constrained assembly" refers to an assembly that is constrained by a tension bearing member 210 or 211 exemplarily illustrated in FIG. 2A, for example, on a rear surface 201a of a first object 201.

The method disclosed herein is a mechanical method for attaching objects, for example, 201, 212, 213, 217, etc., made of dissimilar materials to each other without using any bonding material. The dissimilar materials of the objects, for example, 201, 212, 213, 217, etc., that are attached to each other comprise a first material of a first object 201 exemplarily illustrated in FIGS. 2A-2C, and different second materials of one or more second objects, for example, 212, 213, 217, etc., exemplarily illustrated in FIGS. 2A-2C, attached to the first object 201. The method disclosed herein comprises attaching second objects, for example, metal, plastic parts such as brackets, hinges, etc., to a first object 201, for example, a tile, to form an assembly without marring the face of the first object 201 and the second objects in the assembly. For example, two or more first objects 201 exemplarily illustrated in FIG. 2A, can be attached together to construct, for example, a box. The method disclosed herein uses mechanical power and hand tools for attaching second objects, for example, 212, 213, 217, etc., made of second materials dissimilar to a first material of a first object 201 to the front surface 201b and/or the rear surface 201a of the first object 201 without marring the front surface 201b and/or the rear surface 201a of the first object 201. The method disclosed herein does not require use of glues or mortar for attaching objects, for example, 212, 213, 217, etc., made of dissimilar materials to the front surface 201b and/or the rear surface 201a of the first object 201.

The method disclosed herein comprises assembling an attachment apparatus 200 comprising anchoring elements 202, a tension assembly 204, and at least two tension bearing members 210 and 211 as exemplarily illustrated in FIG. 2A, and attaching one or more second objects, for example, 212, 213, 217, etc., exemplarily illustrated in FIGS. 2A-2C, made of multiple second materials dissimilar to a first material of a first object 201, to the front surface 201b and/or the rear surface 201a of the first object 201 exemplarily illustrated in FIGS. 2A-2C, using the assembled attachment apparatus 200 exemplarily illustrated in FIG. 2A. As used herein, "anchoring element" refers to an element comprising, for example, grooves 203 or 221, an attachment element 222, etc., used to anchor and secure a tension bearing member 210 or 211, for example, a metal wire or any wire that can sustain tension, as exemplarily illustrated in FIGS. 2A-2C, FIG. 3, FIG. 4A, and FIG. 6A. In an embodiment, the anchoring elements 202 comprise grooves 203 created at the opposing ends 201c and 201d of the first object 201 as exemplarily illustrated in FIGS. 2A-2C, or grooves 221 created at locations 201i and 201j proximal to the opposing ends 201c and 201d of the first object 201 respectively, on the rear surface 201a of the first object 201 as exemplarily illustrated in FIG. 4A. In an embodiment, the tension bearing members 210 and 211 are wires made of a metal, for example, aluminum, iron, copper, etc., connected to the opposing ends 201c and 201d of the first object 201 respectively, via the grooves 203. The tension bearing members 210 and 211 are made of wires so that the tension bearing members 210 and 211 can sustain tension and resist an abrasive surface of a material of the first object 201 and/or the materials of the second objects, for example, 212, 213, 217, etc., exemplarily illustrated in FIGS. 2A-2C, FIG. 3, and FIG. 4A, that the tension bearing members 210 and 211 contact. The strength of the tension bearing members 210 and 211 depends on loads of the first object 201 and/or the second objects, for example, 212, 213, 217, etc., that are applied to the tension bearing members 210 and 211. For example, the tension bearing members 210 and 211 of the attachment apparatus 200 used in an architectural planter can hold about 60 pounds of tension which is sufficient to hold the architectural planter together.

The attachment apparatus 200 exemplarily illustrated in FIG. 2A, is assembled as follows: The anchoring elements 202 are positioned 101 at opposing sections 201e and 201f of the first object 201. In an embodiment, the anchoring elements 202 are positioned at the opposing ends 201c and 201d of the first object 201 as exemplarily illustrated in FIG. 2A. In another embodiment, the anchoring elements 202 are positioned at locations 201i and 201j proximal to the opposing ends 201c and 201d of the first object 201 respectively, on the rear surface 201a of the first object 201 as exemplarily illustrated in FIG. 4A and FIG. 6A. The anchoring elements 202 are configured to anchor the tension bearing members 210 and 211 on the first object 201.

One or more of the tension bearing members 210 and 211 are connected 102 to one or more second objects, for example, 212, 213, 217, etc., exemplarily illustrated in FIGS. 2A-2C, positioned at one or more of the opposing sections 201e and 201f on the front surface 201b and/or the rear surface 201a of the first object 201, via the anchoring elements 202. In an embodiment as exemplarily illustrated in FIGS. 2A-2C, a tension bearing member 210 is looped through a second object, for example, the supplementary object 217 positioned on the front surface 201b of the first object 201, then extended through the anchoring elements 202 comprising the grooves 203 towards the rear surface 201a of the first object 201, and then connected to the tension assembly 204 configured to generate a tension in the tension bearing member 210. In this embodiment, another second object, for example, the constrained assembly 212 at the opposing section 201e on the rear surface 201a of the first object 201 is then positioned underneath the tension bearing member 210 such that the tension bearing member 210 is positioned in orifices 214 of the constrained assembly 212 and sandwiched between bolt members 215 and washers 216 of the constrained assembly 212 as exemplarily illustrated in FIG. 2A. Furthermore, another second object, for example, the constrained assembly 213 at the opposing section 201f on the rear surface 201a of the first object 201 is positioned underneath the tension bearing member 211 such that the tension bearing member 211 is positioned in orifices 214 of the constrained assembly 213 and sandwiched between the bolt members 215 and the washers 216 of the constrained assembly 213 as exemplarily illustrated in FIG. 2A.

In another embodiment, both the tension bearing members 210 and 211 extend from the anchoring elements 202 comprising the grooves 203 and connect 102 to second objects, for example, the constrained assemblies 212 and 213 positioned at the opposing sections 201e and 201f on the rear surface 201a of the first object 201. In another embodiment as exemplarily illustrated in FIG. 4A and FIG. 6A, both the tension bearing members 210 and 211 extend from the anchoring elements 202 comprising the grooves 221 and the attachment element 222 positioned at the locations 201i and 201j proximal to the opposing ends 201c and 201d of the first object 201 respectively, on the rear surface 201a of the first object 201 and connect 102 to second objects, for example, the constrained assemblies 212 and 213 positioned at the opposing sections 201e and 201f on the rear surface 201a of the first object 201. In an embodiment, the constrained assemblies 212 and 213 are used to generate tension in the tension bearing members 210 and 211 by fastening the bolt members 215 of the constrained assemblies 212 and 213 as disclosed with reference to the constrained assembly 213 in the detailed description of FIG. 8.

In the method disclosed herein, the tension bearing members 210 and 211 extend 103 at the opposing sections 201e and 201f on the rear surface 201a of the first object 201, and the front ends 210a and 211a of the extended tension bearing members 210 and 211 are operably connected 103 to the tension assembly 204 to allow generation of a tension in the extended tension bearing members 210 and 211. The tension assembly 204 is positioned substantially at a mid-section 201g between the opposing sections 201e and 201f on the rear surface 201a of the first object 201 as exemplarily illustrated in FIG. 2A. The tension assembly 204 is configured to operably connect the extended tension bearing members 210 and 211 to generate 104 a tension in the extended tension bearing members 210 and 211 to attach the front surface 201b and/or the rear surface 201a of the first object 201 made of the first material to the second objects, for example, the supplementary object 217 and the constrained assemblies 212 and 213 made of second materials dissimilar to the first material of the first object 201 without any bonding material. The constrained assemblies 212 and 213 are constrained by the tension bearing members 210 and 211 on the opposing sections 201e and 201f of the rear surface 201a of the first object 201. The attachment apparatus 200 disclosed herein therefore attaches one or more second objects, for example, 212, 213, 217, etc., made of multiple second materials dissimilar to the first material of the first object 201 to the front surface 201b and/or the rear surface 201a of the first object 201 made of the first material, without requiring any bonding material, for example, adhesives or any type of chemical bonding material.

The method disclosed herein can be used for constructing any form of an assembly, for example, architectural planters of multiple shapes, retaining walls or similar structures, wall cladding structures, furniture items such as chests, bookcases, benches, tables, kitchen cabinets, etc. In an embodiment, retaining walls (not shown) constructed by attaching a first object 201 to another first object (not shown) by the method disclosed herein can withstand weather seismic occurrences better than conventional masonry structures. These retaining walls can withstand weather seismic occurrences due to the inherent flexibility of the tension bearing members 210 and 211 of the attachment apparatus 200 used in the retaining walls and steel construction of second objects, for example, the constrained assemblies 212 and 213 that are used to attach a first object 201 to an adjacent first object. In an embodiment, a first object 201 and an adjacent first object attached together by the attachment apparatus 200 can move relative to one another unlike conventional masonry structures. In an embodiment, in the construction of wall cladding structures (not shown), a first object 201 can be directly bolted to wall studs using the attachment apparatus 200 disclosed herein rather than attaching the first object 201 to an interior wall using bonding materials such as glue, adhesives, etc.

Assembling a first object 201 to one or more second objects, for example, 212, 213, 217, etc., exemplarily illustrated in FIGS. 2A-2C, allows modular construction and allows the first object 201 and the second objects, for example, 212, 213, 217, etc., to be attached mechanically. One or more objects comprising the first object 201 and the second objects, for example, 212, 213, 217, etc., can be attached together to build a large and complex structure. For example, a person can avoid hiring a mason to construct an architectural planter and instead can buy a kit comprising a first object 201, one or more second objects, for example, 212, 213, 217, etc., and components of the attachment apparatus 200 disclosed herein that are required to attach the first object 201 and the second objects, for example, 212, 213, 217, etc., together to construct the architectural planter structure with minimal skill.

FIG. 2A exemplarily illustrates a rear perspective view showing the attachment apparatus 200 positioned on a rear surface 201a of a first object 201, and one or more second objects comprising, for example, a supplementary object 217 and a set of constrained assemblies 212 and 213 attached to a front surface 201b and a rear surface 201a of the first object 201 respectively, using the attachment apparatus 200. The attachment apparatus 200 is assembled on the rear surface 201a of the first object 201 as disclosed in the detailed description of FIG. 1. The attachment apparatus 200 is used to attach objects, for example, 201, 212, 213, and 217 made of dissimilar materials. The first object 201 is, for example, a tile made of a ceramic material, and the second objects are, for example, a supplementary object 217 such as an L shaped bracket made of steel and a set of constrained assemblies 212 and 213 as exemplarily illustrated in FIGS. 2A-2C. In an embodiment, the constrained assemblies 212 and 213 can be attached in conjunction with the supplementary object 217 on the first object 201 as exemplarily illustrated in FIG. 2A. Although the constrained assemblies 212 and 213 and the supplementary object 217 have different geometries, in an embodiment, the supplementary object 217 is attached on the front surface 201b of the first object 201 and the constrained assemblies 212 and 213 are attached on the rear surface 201a of the first object 201 using the attachment apparatus 200. Both the constrained assemblies 212 and 213 and the supplementary object 217 are considered as second objects made of second materials dissimilar from the first material of the first object 201. In another embodiment as exemplarily illustrated in FIG. 3, the supplementary object 217 can be solely attached to the first object 201 using the attachment apparatus 200, without the constrained assemblies 212 and 213. In another embodiment as exemplarily illustrated in FIG. 4A, only the constrained assemblies 212 and 213 can be attached to the first object 201 using the attachment apparatus 200, without the supplementary object 217. In an embodiment, the constrained assemblies 212 and 213 can be used for attaching one first object 201 to another first object.

As exemplarily illustrated in FIG. 2A, the attachment apparatus 200 disclosed herein comprises the anchoring elements 202, the tension assembly 204, and at least two tension bearing members 210 and 211. The attachment apparatus 200 is attached to the rear surface 201a of the first object 201, and the second objects, for example, 212, 213, 217, etc., are attached to the front surface 201b and the rear surface 201a of the first object 201 using the attachment apparatus 200 as exemplarily illustrated in FIG. 2A. In an embodiment as exemplarily illustrated in FIG. 2A, the anchoring elements 202 comprise, for example, grooves 203 positioned at the opposing ends 201c and 201d of the first object 201. A second object, for example, the supplementary object 217 is attached proximal to the opposing end 201c on a section 201h of the front surface 201b of the first object 201 using the tension bearing member 210 as exemplarily illustrated in FIGS. 2A-2C. That is, the tension bearing member 210 is looped through the supplementary object 217 positioned on the front surface 201b of the first object 201 and constrains the supplementary object 217 against the first object 201 via the grooves 203 as exemplarily illustrated in FIGS. 2A-2C. The constrained assemblies 212 and 213 are positioned at the opposing sections 201e and 201f of the first object 201 respectively, on the rear surface 201a of the first object 201. In an embodiment, in addition to attaching a supplementary object 217 to the front surface 201b of the first object 201, the constrained assemblies 212 and 213 can also be used for attaching other supplementary objects to the rear surface 201a of the first object 201. This embodiment is compatible with each type of the constrained assembly 212 or 213 exemplarily illustrated in FIG. 2A, FIG. 4A, FIG. 6A, FIGS. 7A-7B, and FIGS. 8-12.

In an embodiment, the supplementary object 217 comprises through holes 220 exemplarily illustrated in FIG. 2B, to receive the tension bearing member 210. The tension bearing member 210 is looped through the supplementary object 217 by passing the front ends 210a of the tension bearing member 210 through the through holes 220 of the supplementary object 217 as exemplarily illustrated in FIG. 2B. The front ends 210a of the looped tension bearing member 210 are then passed through the grooves 203 at the opposing end 201c of the first object 201 and extended towards the tension assembly 204 positioned substantially at a mid-section 201g between the opposing sections 201e and 201f on the rear surface 201a of the first object 201. Similarly, the other tension bearing member 211 is looped through the grooves 203 at the opposing end 201d of the first object 201 by passing the front ends 211a of the tension bearing member 211 through the grooves 203 and extending the front ends 211a of the tension bearing member 211 towards the tension assembly 204 on the rear surface 201a of the first object 201.

The extended front ends 210a and 211a of the tension bearing members 210 and 211 respectively, are connected to the tension assembly 204 by inserting the front ends 210a and 211a of the tension bearing members 210 and 211 respectively, into through holes 208 and 209 of washers 206 and 207 of the tension assembly 204 respectively, and tying or welding the inserted front ends 210a and 211a of the tension bearing members 210 and 211 respectively, on the opposing surfaces 206a and 207a of the washers 206 and 207 of the tension assembly 204 respectively. The front ends 210a and 211a of the tension bearing members 210 and 211 respectively, are tied together or welded to form a wire loop as exemplarily illustrated in FIG. 2A. The tension bearing members 210 and 211 are first tightened sufficiently such that the tension bearing members 210 and 211 are engaged in the grooves 203 at the opposing ends 201c and 201d of the first object 201 respectively, by sufficient tension generated by turning nuts 218 and 219 of the tension assembly 204. The constrained assemblies 212 and 213 are then positioned underneath the tension bearing members 210 and 211 respectively, such that the tension bearing members 210 and 211 are positioned in the orifices 214 of the constrained assemblies 212 and 213 respectively and sandwiched between the bolt members 215 and the washers 216 of the constrained assemblies 212 and 213. The tension bearing members 210 and 211 are then further tightened by adjusting the nuts 218 and 219 of the tension assembly 204 until sufficient tension is generated in the tension bearing members 210 and 211. The constrained assemblies 212 and 213 are then positioned along the tension bearing members 210 and 211 respectively, in close proximity to the grooves 203 at the opposing ends 201c and 201d of the first object 201 respectively. The bolt members 215 of the constrained assemblies 212 and 213 are then tightened to restrict movement of the constrained assemblies 212 and 213 along the tension bearing members 210 and 211 respectively as exemplarily illustrated in FIG. 2A.

The supplementary object 217 made of a second material is thereby attached to the front surface 201b of the first object 201 made of a first material using the attachment apparatus 200, while the constrained assemblies 212 and 213 made of a second material are attached to the rear surface 201a of the first object 201 using the attachment apparatus 200 as exemplarily illustrated in FIG. 2A. Multiple second objects comprising, for example, the supplementary object 217 made of a tile material of any shape and size can be mounted on the front surface 201b of the first object 201. For purposes of illustration, the detailed description refers to a supplementary object 217 such as an L shaped bracket being attached to the front surface 201b of the first object 201; however the scope of the method disclosed herein is not limited to the supplementary object 217 such as an L shaped bracket being attached to the front surface 201b of the first object 201, but may be extended to include attachment of other supplementary objects, for example, a handle, a hinge, and other functionally equivalent structures to the front surface 201b and/or the rear surface 201a of the first object 201.

FIG. 2B exemplarily illustrates a partial front elevation view showing a second object, for example, a supplementary object 217 attached to a front surface 201b of a first object 201 via a tension bearing member 210 looped through the supplementary object 217. The through holes 220 configured on an outer surface 217a of the supplementary object 217 receive the tension bearing member 210 in the form of a loop for attaching the supplementary object 217 to the front surface 201b of the first object 201 as exemplarily illustrated in FIG. 2B.

FIG. 2C exemplarily illustrates a partial front perspective view showing a second object, for example, a supplementary object 217 attached to a front surface 201b of a first object 201 via a tension bearing member 210 looped through the supplementary object 217. The supplementary object 217 is attached to the front surface 201b of the first object 201 by passing the front ends 210a of the tension bearing member 210 through the through holes 220 of the supplementary object 217 exemplarily illustrated in FIG. 2B, and in through the grooves 203 at the opposing end 201c of the first object 201 as exemplarily illustrated in FIG. 2C. The tension bearing member 210 looped through the supplementary object 217 constrains the supplementary object 217 against the front surface 201b of the first object 201 via the grooves 203 as exemplarily illustrated in FIG. 2C.

An example of the method for attaching a first object 201, for example, a tile, and a second object, for example, a supplementary object 217 such as an L shaped bracket exemplarily illustrated in FIGS. 2A-2C, made of dissimilar materials using the attachment apparatus 200 exemplarily illustrated in FIG. 2A, is provided herein. The tension bearing member 210 is looped through the supplementary object 217 positioned on the front surface 201b of the first object 201 and extended through the grooves 203 at the opposing end 201c of the first object 201, while the tension bearing member 211 is looped around the grooves 203 at the opposing end 201d of the first object 201. In this example, the grooves 203 are cut into the opposing ends 201c and 201d of the first object 201 such that the grooves 203 support and accommodate the looping of the tension bearing members 210 and 211 through the grooves 203. The tension bearing members 210 and 211 threaded into and/or around the grooves 203 are connected to the adjustable tension assembly 204 exemplarily illustrated in FIG. 2A. The front ends 210a and 211a of the tension bearing members 210 and 211 respectively, are connected to the tension assembly 204. The tension assembly 204 comprises a threaded rod 205 with two washers 206 and 207 positioned proximal to the ends 205a and 205b of the threaded rod 205 respectively, as exemplarily illustrated in FIG. 2A. The front ends 210a and 211a of the tension bearing members 210 and 211 respectively, are passed through the through holes 208 and 209 of the washers 206 and 207 of the tension assembly 204 respectively, and tied in knots 210b and 211b exemplarily illustrated in FIGS. 4A-4B, on the opposing surfaces 206a and 207a of the washers 206 and 207 respectively, or welded to each other to form a loop on the opposing surfaces 206a and 207a of the washers 206 and 207 respectively. Nuts 218 and 219 and washers 225 and 226 at the ends 205a and 205b of the threaded rod 205 of the tension assembly 204 respectively, exemplarily illustrated in FIG. 5, are tightened to securely hold the tension bearing members 210 and 211 respectively, in position for creating tension in the tension bearing members 210 and 211.

Along each length of the tension bearing members 210 and 211 and between the grooves 203 and the tension assembly 204, the constrained assemblies 212 and 213 are positioned as exemplarily illustrated in FIG. 2A. The constrained assemblies 212 and 213 are attached to the rear surface 201a of the first object 201 by way of a tension force created by the tension bearing members 210 and 211 connected to the washers 206 and 207 of the tension assembly 204 respectively. The attachment apparatus 200 disclosed herein therefore attaches the supplementary object 217 made of a second material dissimilar to the first material of the first object 201 by a tension force created by the tension bearing member 210, and further attaches the constrained assemblies 212 and 213 made of a second material dissimilar to the first material to the first object 201 by a tension force created by the tension bearing members 210 and 211 respectively. In an embodiment, the strength of the tension force in the tension assembly 204 is modified to allow the tension bearing members 210 and 211 to hold the objects 201, 212, 213, and 217 made of dissimilar materials in position. The strength of the tension force in the tension assembly 204 can be modified by adjusting the nuts 218 and 219 and the washers 225 and 226 on the ends 205a and 205b of the threaded rod 205 of the tension assembly 204 respectively.

Figure 3:
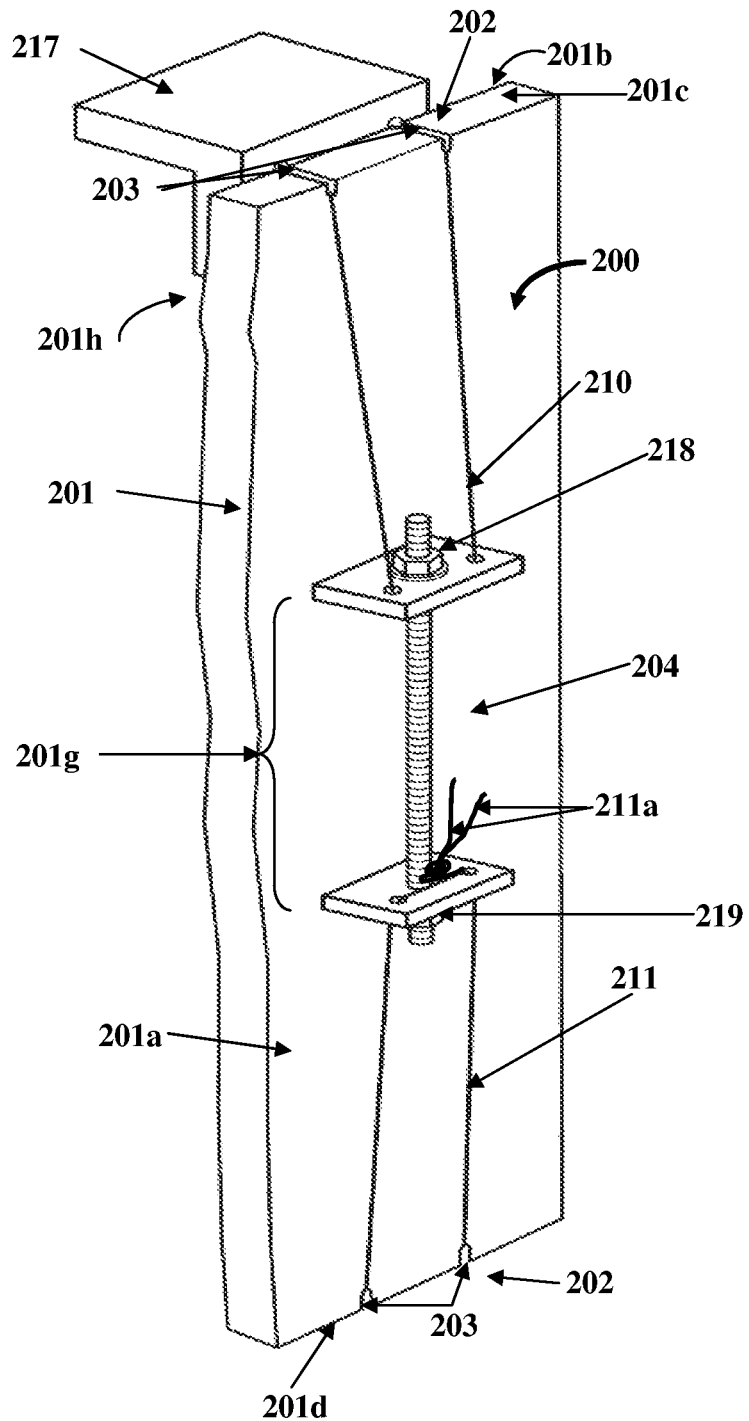
FIG. 3 exemplarily illustrates a rear perspective view showing the attachment apparatus positioned on a rear surface of a first object, and a second object, for example, a supplementary object attached to a front surface of the first object using the attachment apparatus.

FIG. 3 exemplarily illustrates a rear perspective view showing the attachment apparatus 200 positioned on a rear surface 201a of a first object 201, and a second object, for example, a supplementary object 217 attached to a front surface 201b of the first object 201 using the attachment apparatus 200. The attachment apparatus 200 is assembled on the rear surface 201a of the first object 201 as disclosed in the detailed description of FIG. 1. The anchoring elements 202 comprising the grooves 203 are positioned at the opposing ends 201c and 201d of the first object 201. The supplementary object 217 is attached at the opposing end 201c of the first object 201, on a section 201h on the front surface 201b of the first object 201 using the tension bearing member 210 as exemplarily illustrated in FIG. 3. The tension bearing members 210 and 211 are extended from the grooves 203 and connected to the tension assembly 204 positioned substantially at the mid-section 201g on the rear surface 201a of the first object 201. The tension assembly 204 generates tension in the tension bearing members 210 and 211 to constrain the supplementary object 217 against the section 201h on the front surface 201b of the first object 201.

Figure 4:
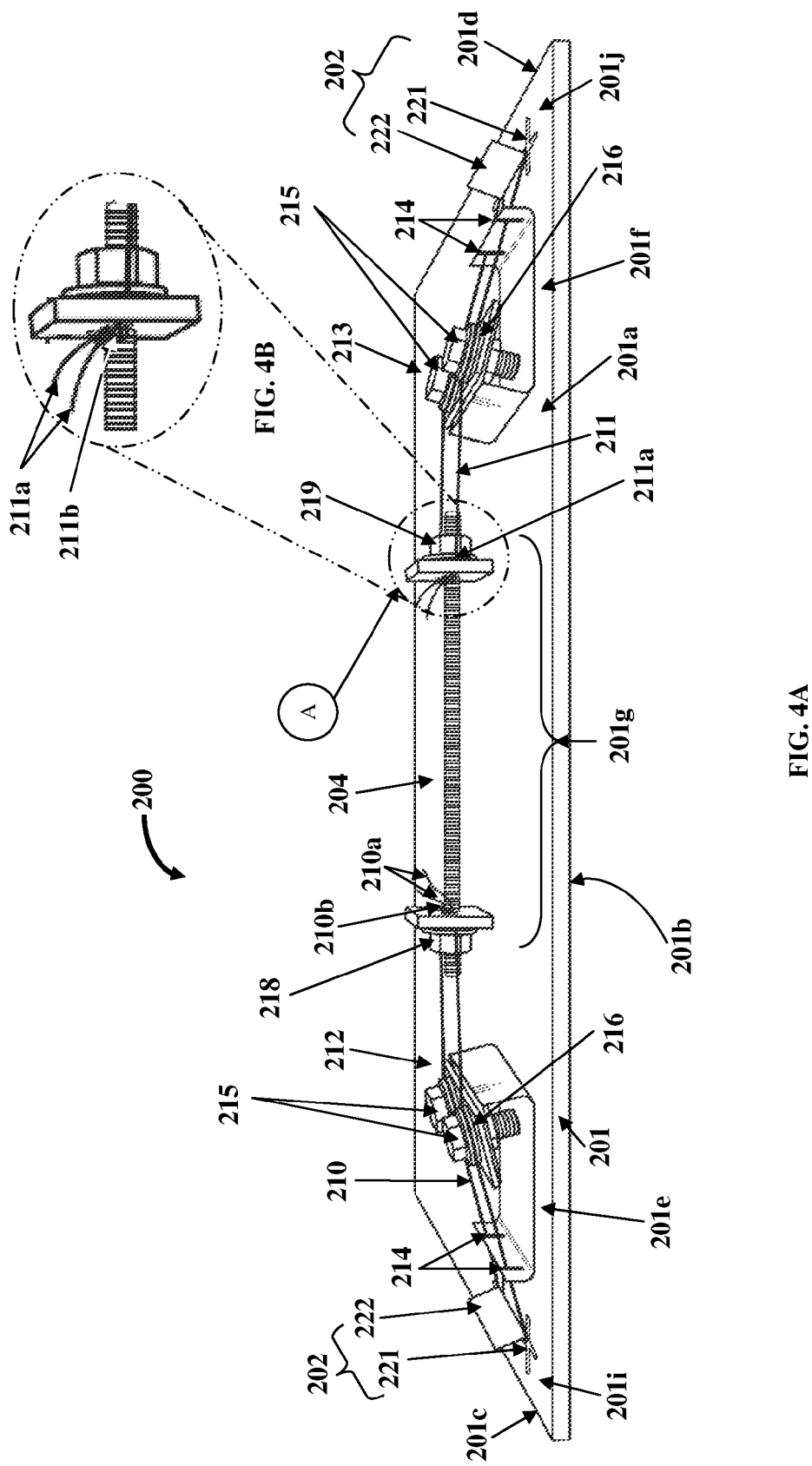
FIG. 4A exemplarily illustrates a side perspective view of the attachment apparatus for attaching a first object made of a first material to a second object, for example, a set of constrained assemblies made of a second material dissimilar from the first material of the first object without marring a rear surface of the first object.
FIG. 4B exemplarily illustrates an enlarged view of a portion marked A of the attachment apparatus shown in FIG. 4A, showing front ends of a tension bearing member tied in a knot.
Figure 5:
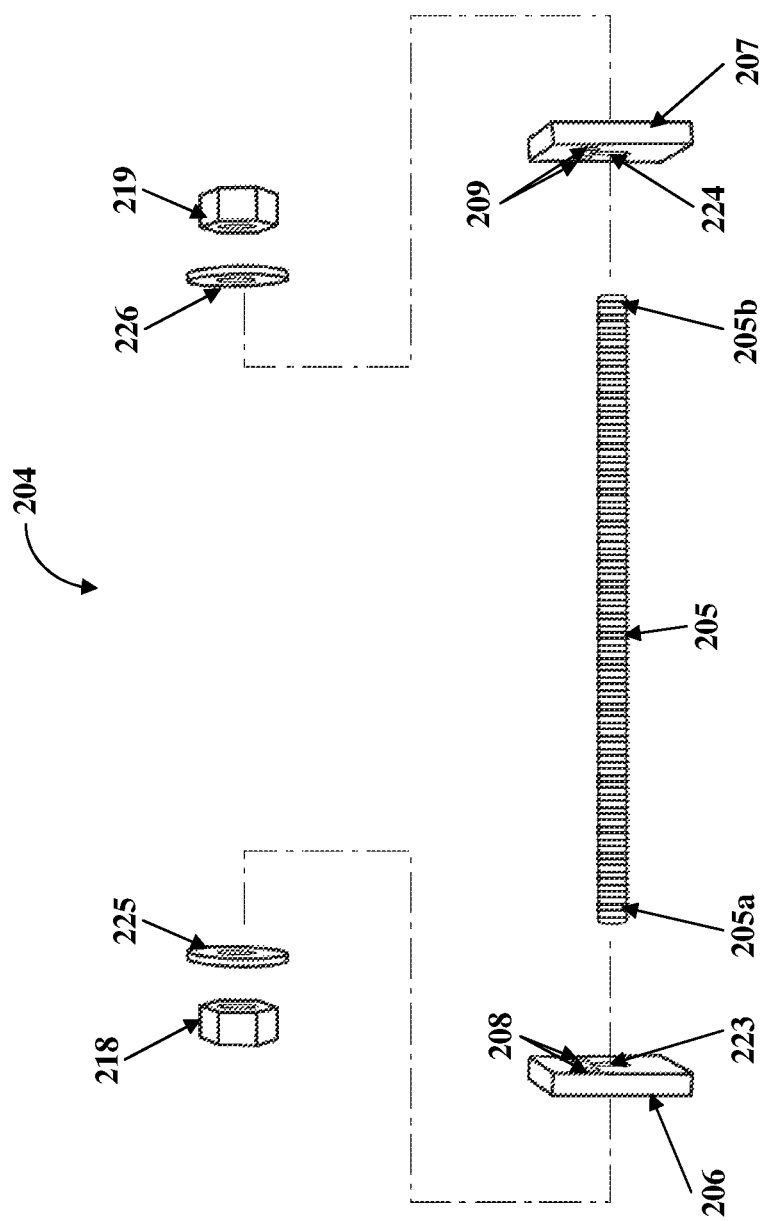
FIG. 5 exemplarily illustrates an exploded view of a tension assembly of the attachment apparatus.

FIG. 4A exemplarily illustrates a side perspective view of the attachment apparatus 200 for attaching a first object 201 made of a first material to a second object, for example, a set of constrained assemblies 212 and 213 made of a second material dissimilar from the first material of the first object 201, without marring a rear surface 201a of the first object 201. The first object 201 is, for example, a tile, a block, a pipe, etc. For purposes of illustration, the detailed description refers to the first object 201 being a tile; however, the scope of the method disclosed herein is not limited to the first object 201 being a tile, but may be extended to include, for example, a wooden structure, a metal structure, and a functionally equivalent structure of any shape and size that is attachable to another first object or to a second object, for example, 212, 213, 217, etc., exemplarily illustrated in FIGS. 2A-2C and FIG. 4A. In an embodiment, the surface of the first object 201 to which dissimilar materials can be attached can be a front surface 201b of the first object 201. In another embodiment, the surface of the first object 201 to which dissimilar materials can be attached can be the rear surface 201a of the first object 201. As exemplarily illustrated in FIG. 4A, the attachment apparatus 200 is utilized to constrain second objects, for example, the constrained assemblies 212 and 213 against the rear surface 201a of the first object 201. The attachment apparatus 200 exemplarily illustrated in FIG. 4A, comprises the anchoring elements 202, the tension assembly 204, and at least two tension bearing members 210 and 211. In an embodiment as exemplarily illustrated in FIG. 4A, the anchoring elements 202 are positioned at locations 201i and 201j proximal to the opposing ends 201c and 201d of the first object 201 respectively, on the rear surface 201a of the first object 201. Each of the opposing ends 201c and 201d of the first object 201 are defined by a top edge and a bottom edge of the first object 201.

In an embodiment, each of the anchoring elements 202 of the attachment apparatus 200 comprises grooves 221 and an attachment element 222 inserted into the grooves 221 as exemplarily illustrated in FIG. 4A. The grooves 221 are created at the locations 201i and 201j proximal to the opposing ends 201c and 201d of the first object 201 respectively, on the rear surface 201a of the first object 201. The attachment element 222 is configured as an angled bracket exemplarily illustrated in FIG. 4A, that is inserted into the grooves 221 for distributing a load caused by the tension of the tension bearing members 210 and 211. The attachment elements 222 offer a steady force against the tension of the tension bearing members 210 and 211 and any variations in a height and/or a width of the orifices 214 of the constrained assemblies 212 and 213. The force offered by the attachment elements 222 tend to distribute the forces of tension as per the requirements and weight limits of the objects, for example, 201, 212, 213, etc., made of dissimilar materials, while still keeping the second objects, for example, the constrained assemblies 212 and 213 made of dissimilar materials attached to the first object 201. In an embodiment, each attachment element 222 is configured as a plate, for example, a metal sheet, a metal piece, etc. As exemplarily illustrated in FIG. 4A, the front surface 201b of the first object 201 is left undisturbed and no grooves 221 and/or constrained assemblies 212 and 213 are positioned on the front surface 201b of the first object 201.

The tension bearing members 210 and 211 are hooked onto the anchoring elements 202 at the opposing sections 201e and 201f respectively, on the rear surface 201a of the first object 201 and extend from the anchoring elements 202. The tension bearing members 210 and 211 are operably connected to each other under a tension via the tension assembly 204 positioned substantially at a mid-section 201g between the opposing sections 201e and 201f on the rear surface 201a of the first object 201. In an embodiment, the tension bearing members 210 and 211 are configured as wire loops that are wrapped around the attachment elements 222 similar to a pulley. As exemplarily illustrated in FIG. 4A, the tension bearing members 210 and 211 are wound or looped around their respective attachment elements 222 that are inserted in respective grooves 221 created at the locations 201i and 201j proximal to the opposing ends 201c and 201d of the first object 201 respectively, on the rear surface 201a of the first object 201, while the front ends 210a and 211a of the tension bearing members 210 and 211 respectively, are operably connected to the tension assembly 204.

Figure 11:
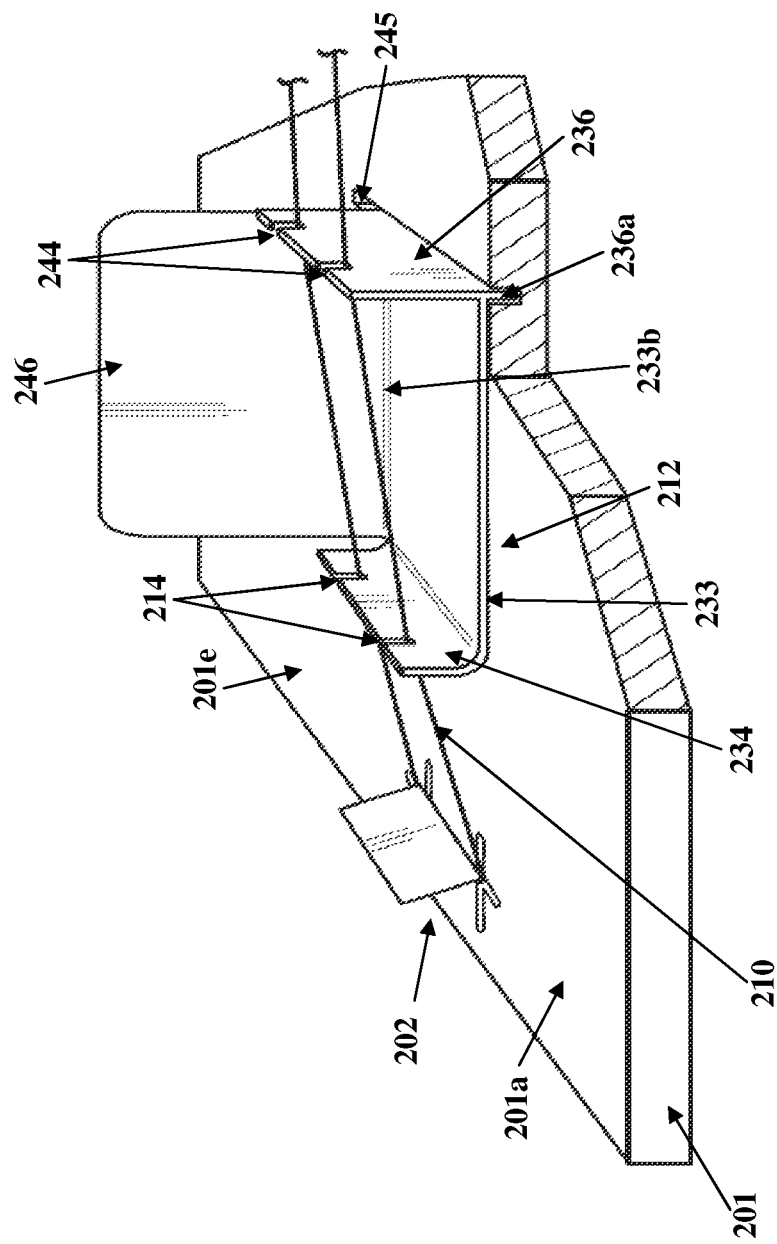
FIG. 11 exemplarily illustrates a partial side perspective view of an embodiment of a second object, for example, a constrained assembly, showing a portion of a flanged end of a flanged element of the constrained assembly extending into a channel created in a first object.
Figure 12:
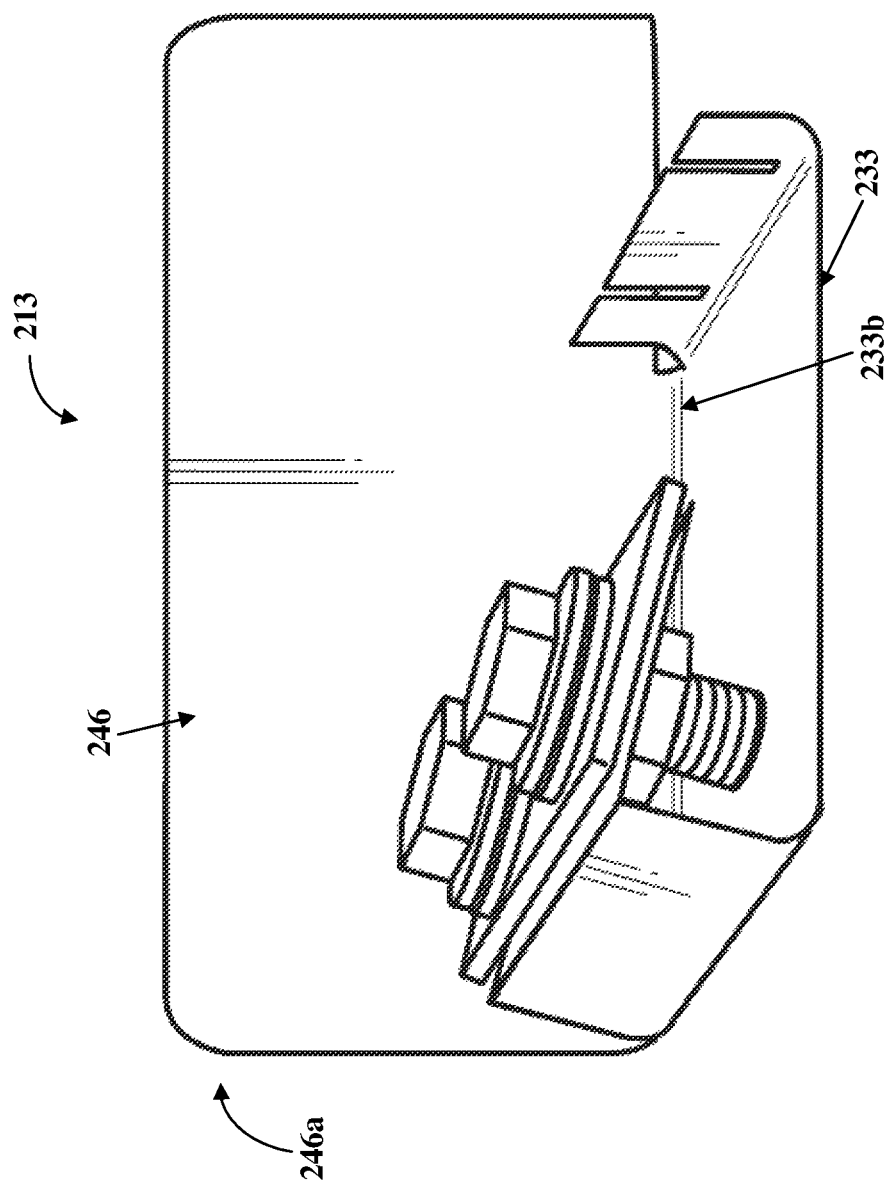
FIG. 12 exemplarily illustrates a side perspective view of an embodiment of a second object, for example, a constrained assembly, showing a support flange extending from a side edge of the constrained assembly.

The constrained assemblies 212 and 213 are, for example, brackets or other functionally equivalent structures of any shape that have a geometry similar to one of the constrained assemblies 212 and 213 exemplarily illustrated in FIG. 11 and FIG. 12. The constrained assemblies 212 and 213 are positioned at the opposing sections 201e and 201f respectively, on the rear surface 201a of the first object 201 as exemplarily illustrated in FIG. 4A. The constrained assemblies 212 and 213 are positioned below the tension bearing members 210 and 211 extending from the anchoring elements 202 positioned at the opposing sections 201e and 201f of the first object 201 respectively, such that the tension bearing members 210 and 211 are positioned in the orifices 214 of the constrained assemblies 212 and 213 respectively and sandwiched between the bolt members 215 and the washers 216 of the constrained assemblies 212 and 213. The tension bearing members 210 and 211 are tightened by adjusting the nuts 218 and 219 of the tension assembly 204 until sufficient tension is generated in the tension bearing members 210 and 211. The constrained assemblies 212 and 213 are constrained against the rear surface 201a of the first object 201 by the tension bearing members 210 and 211 connected to each other via the tension assembly 204. The bolt members 215 of the constrained assemblies 212 and 213 are tightened to restrict movement of the constrained assemblies 212 and 213 along the tension bearing members 210 and 211 respectively, as exemplarily illustrated in FIG. 4A. The attachment apparatus 200 is thereby configured to attach the constrained assemblies 212 and 213 made of a second material dissimilar to the first material of the first object 201 to the rear surface 201a of the first object 201.

FIG. 4B exemplarily illustrates an enlarged view of a portion marked A of the attachment apparatus 200 shown in FIG. 4A, showing the front ends 211a of the tension bearing member 211 tied in a knot 211b. In an embodiment, the front ends 210a and 211a of the tension bearing members 210 and 211 respectively, are tied to the tension assembly 204 in knots 210b and 211b respectively, as exemplarily illustrated in FIGS. 4A-4B.

FIG. 5 exemplarily illustrates an exploded view of the tension assembly 204 of the attachment apparatus 200 exemplarily illustrated in FIG. 2A, FIG. 3, and FIG. 4A. The tension assembly 204 operably connects the tension bearing members 210 and 211 exemplarily illustrated in FIG. 2A, FIG. 3, and FIG. 4A, to generate a tension in the tension bearing members 210 and 211. In an embodiment, the tension assembly 204 comprises a threaded rod 205 and at least two nuts 218 and 219 threadably engaged to opposing ends 205a and 205b of the threaded rod 205 respectively. The nuts 218 and 219 are tightened to generate the tension in the tension bearing members 210 and 211. The tension assembly 204 further comprises washers 225, 206 and 226, 207 engaged to the opposing ends 205a and 205b of the threaded rod 205 respectively.

The washers 206 and 207 further comprise through holes 223 and 224 respectively that receive the opposing ends 205a and 205b of the threaded rod 205 respectively. The nuts 218 and 219 and the washers 225 and 226 are used to fasten the opposing ends 205a and 205b of the threaded rod 205 to the washers 206 and 207 respectively. The washers 206 and 207 engaged to the opposing ends 205a and 205b of the threaded rod 205 further comprise through holes 208 and 209 respectively, configured to receive the front ends 210a and 211a of the tension bearing members 210 and 211 respectively. The front ends 210a and 211a of the tension bearing members 210 and 211 that extend from the anchoring elements 202 exemplarily illustrated in FIG. 2A, FIG. 3, and FIG. 4A, are passed through the through holes 208 and 209 of the washers 206 and 207 positioned on the opposing ends 205a and 205b of the threaded rod 205 of the tension assembly 204 respectively. The nuts 218 and 219 at the opposing ends 205a and 205b of the threaded rod 205 respectively are tightened to securely hold the tied front ends 210a and 211a of the tension bearing members 210 and 211 respectively in position, and to create a tension in the tension bearing members 210 and 211. In an embodiment, any device that achieves the same functions as a threaded rod can be used as the threaded rod 205 in the attachment apparatus 200 disclosed herein. The tension created by the threaded rod 205 keeps the tension bearing members 210 and 211 from being displaced from the grooves 203 or 221 exemplarily illustrated in FIG. 2A, FIG. 2C, and FIG. 4A, thereby holding the constrained assemblies 212 and 213 exemplarily illustrated in FIG. 2A and FIG. 4A, in position.

Figure 6A:
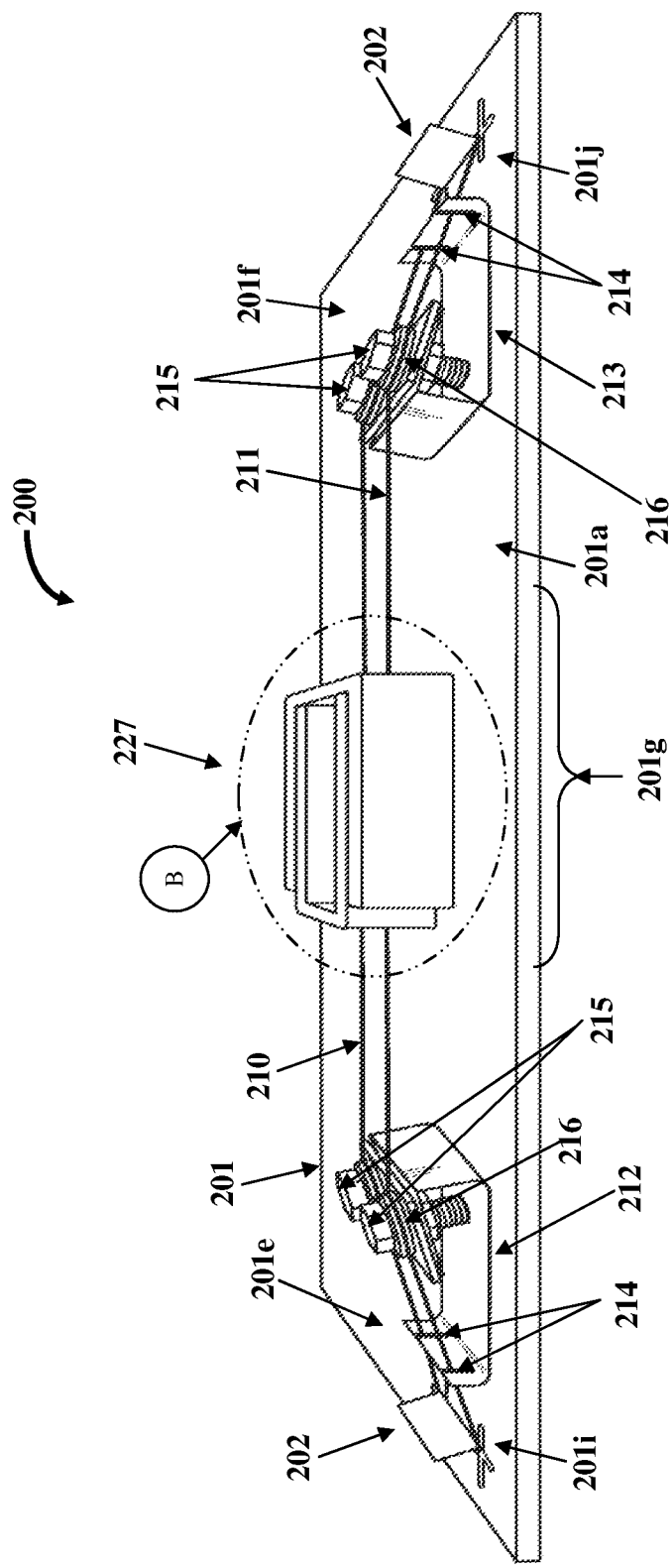
FIG. 6A exemplarily illustrates a side perspective view of the attachment apparatus, showing an embodiment of the tension assembly.

FIG. 6A exemplarily illustrates a side perspective view of the attachment apparatus 200, showing an embodiment of the tension assembly, herein referenced by the numeral 227. In this embodiment, the tension assembly 227 is configured as a static connecting piece that can be used to induce a tension in the tension bearing members 210 and 211. The tension assembly 227 is positioned substantially at the mid-section 201g between the opposing sections 201e and 201f on the rear surface 201a of the first object 201. In this embodiment, the tension assembly 227 comprises at least two inwardly bent members 230 and 231 slidably engaged with each other as exemplarily illustrated in FIGS. 6B-6C and as disclosed in the detailed description of FIGS. 6B-6C.

Figure 6B:
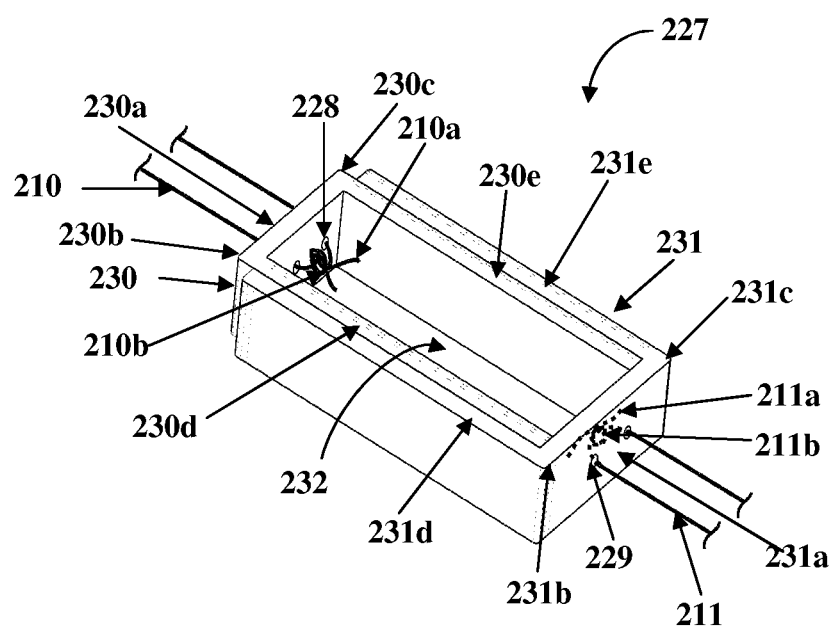
FIG. 6B exemplarily illustrates an enlarged view of a portion marked B of the embodiment of the tension assembly shown in FIG. 6A.

FIG. 6B exemplarily illustrates an enlarged view of a portion marked B of the embodiment of the tension assembly 227 shown in FIG. 6A. In this embodiment, the inwardly bent members 230 and 231 of the tension assembly 227 are configured, for example, as U shaped members as exemplarily illustrated in FIGS. 6B-6C. The inwardly bent members 230 and 231 are made of a material and a thickness that substantially prevents any significant deformation in the inwardly bent members 230 and 231 when tension is applied to the inwardly bent members 230 and 231. The inwardly bent members 230 and 231 are made, for example, of sheet metal. The inwardly bent member 230 is narrower or of a smaller width than the inwardly bent member 231 as exemplarily illustrated in FIGS. 6B-6C, so that the inwardly bent member 230 can slide into the inwardly bent member 231. Each of the inwardly bent members 230 and 231 comprises a central section 230a and 231a comprising through holes 228 and 229 respectively, and wall sections 230d, 230e and 231d, 231e respectively, as exemplarily illustrated in FIG. 6B. The through holes 228 and 229 receive the front ends 210a and 211a of the tension bearing members 210 and 211 respectively. The wall sections 230d and 230e of the inwardly bent member 230 extend perpendicularly from opposing ends 230b and 230c of the central section 230a of the inwardly bent member 230. The wall sections 231d and 231e of the inwardly bent member 231 extend perpendicularly from opposing ends 231b and 231c of the central section 231a of the inwardly bent member 231 and define a space 232 therewithin. As exemplarily illustrated in FIG. 6B, the wall sections 230d and 230e of the inwardly bent member 230 are slidably engaged with the wall sections 231d and 231e of the inwardly bent member 231, within the space 232 defined by the wall sections 231d and 231e of the inwardly bent member 231.

As exemplarily illustrated in FIG. 6A, the tension bearing members 210 and 211 are looped around the anchoring elements 202 positioned on the opposing sections 201e and 201f of the first object 201 respectively. The front ends 210a and 211a of the tension bearing members 210 and 211 respectively, extending from the anchoring elements 202 positioned on the opposing sections 201e and 201f of the first object 201 respectively, are connected to the tension assembly 227. The front ends 210a of the tension bearing member 210 are inserted into the through holes 228 of the central section 230a of the inwardly bent member 230, and the front ends 211a of the tension bearing member 211 are inserted into the through holes 229 of the central section 231a of the inwardly bent member 231. In an embodiment, the front ends 210a of the tension bearing member 210 inserted into the central section 230a of the inwardly bent member 230 are tied in a knot 210b, and the front ends 211a of the tension bearing member 211 inserted into the central section 231a of the inwardly bent member 231 are tied in a knot 211b as exemplarily illustrated in FIG. 6B. The knots 210b and 211b of the tension bearing members 210 and 211 respectively, are located within the space 232 defined by the wall sections 231d and 231e of the inwardly bent member 231 as exemplarily illustrated in FIG. 6B. Each of the knotted tension bearing members 210 and 211 hence form a wire loop.

As exemplarily illustrated in FIG. 6A, after connection of the tension bearing members 210 and 211 to the tension assembly 227, the constrained assemblies 212 and 213 are positioned underneath the tension bearing members 210 and 211 respectively, such that the tension bearing members 210 and 211 are positioned in the orifices 214 of the constrained assemblies 212 and 213 respectively and sandwiched between the bolt members 215 and the washers 116 of the constrained assemblies 212 and 213. The constrained assemblies 212 and 213 are positioned along the tension bearing members 210 and 211 respectively, in close proximity to the anchoring elements 202 on the opposing sections 201e and 201f of the first object 201 respectively. The bolt members 215 of the constrained assemblies 212 and 213 are then tightened to restrict movement of the constrained assemblies 212 and 213 along the tension bearing members 210 and 211 respectively, as exemplarily illustrated in FIG. 6A.

Figure 6C:
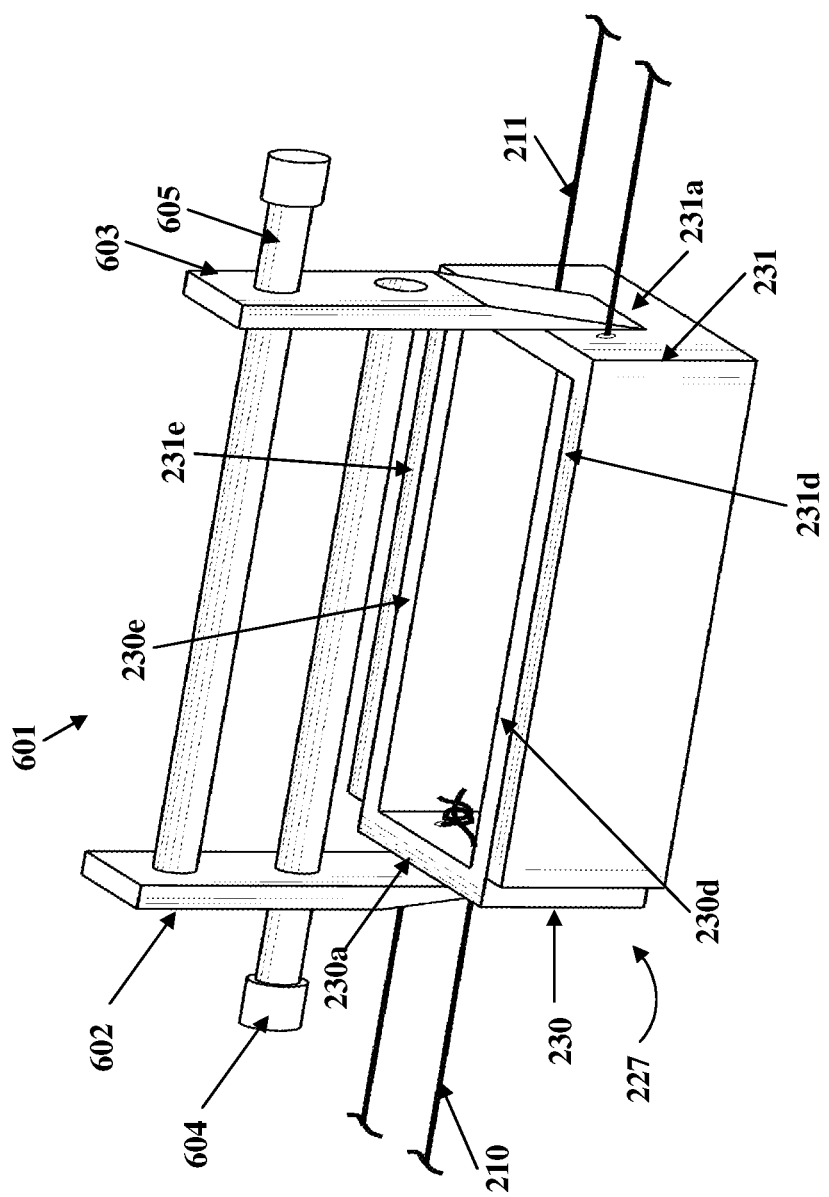
FIG. 6C exemplarily illustrates a perspective view of the embodiment of the tension assembly, showing an external device configured to attach inwardly bent members of the tension assembly.

FIG. 6C exemplarily illustrates a perspective view of the embodiment of the tension assembly 227, showing an external device 601 configured to attach the inwardly bent members 230 and 231 of the tension assembly 227. The tension bearing members 210 and 211 are tensioned by joining the inwardly bent members 230 and 231 of the tension assembly 227 using an external device 601, for example, a one handed bar clamp or a parallel clamp exemplarily illustrated in FIG. 6C. As exemplarily illustrated in FIG. 6C, the external device 601 is a parallel clamp comprising a set of clamping jaws 602 and 603 and a set of screw members 604 and 605 for the clamping jaws 602 and 603 respectively. The desired tension and position of the inwardly bent members 230 and 231 are maintained by the external device 601. The clamping jaws 602 and 603 of the external device 601 are positioned against the central section 230a of the inwardly bent member 230 and the central section 231a of the inwardly bent member 231 respectively, as exemplarily illustrated in FIG. 6C. As the tension bearing members 210 and 211 are being tensioned, the inwardly bent members 230 and 231 of the tension assembly 227 are positioned such that the wall sections 230d and 230e of the inwardly bent member 230 and the wall sections 231d and 231e of the inwardly bent member 231 overlap each other respectively, as exemplarily illustrated in FIGS. 6A-6C. The wall sections 230d, 230e, and 231d, 231e of the inwardly bent members 230 and 231 respectively, are rigidly attached to one another. As the external device 601 is tightened by the screw members 604 and 605, the two inwardly bent members 230 and 231 are brought close to each other and eventually overlap each other. The inwardly bent member 230 slides into the inwardly bent member 231. As a result of the inwardly bent members 230 and 231 being brought close together, a tension is induced in the tension bearing members 210 and 211. The extent to which the inwardly bent members 230 and 231 overlap each other depends on a desired amount of tension in the tension bearing members 210 and 211.

Once the desired tension is achieved in the tension bearing members 210 and 211, the two inwardly bent members 230 and 231 are rigidly attached to each other to form the tension assembly 227, for example, via welding, via adhesive bonding, or by mechanical means. In an embodiment, the inwardly bent members 230 and 231 are attached to each other by welding, if the inwardly bent members 230 and 231 are made of a weldable material such as steel. In another embodiment, the inwardly bent members 230 and 231 are attached to each other by bonding the inwardly bent members 230 and 231 to each other using an adhesive. Once the inwardly bent members 230 and 231 are rigidly attached and the tension in the tension bearing members 210 and 211 is sustained by the rigid attachment of the inwardly bent members 230 and 231, the external device 601 exemplarily illustrated in FIG. 6C, that initially creates the tension in the tension bearing members 210 and 211 is loosened and removed.

Figure 7A:
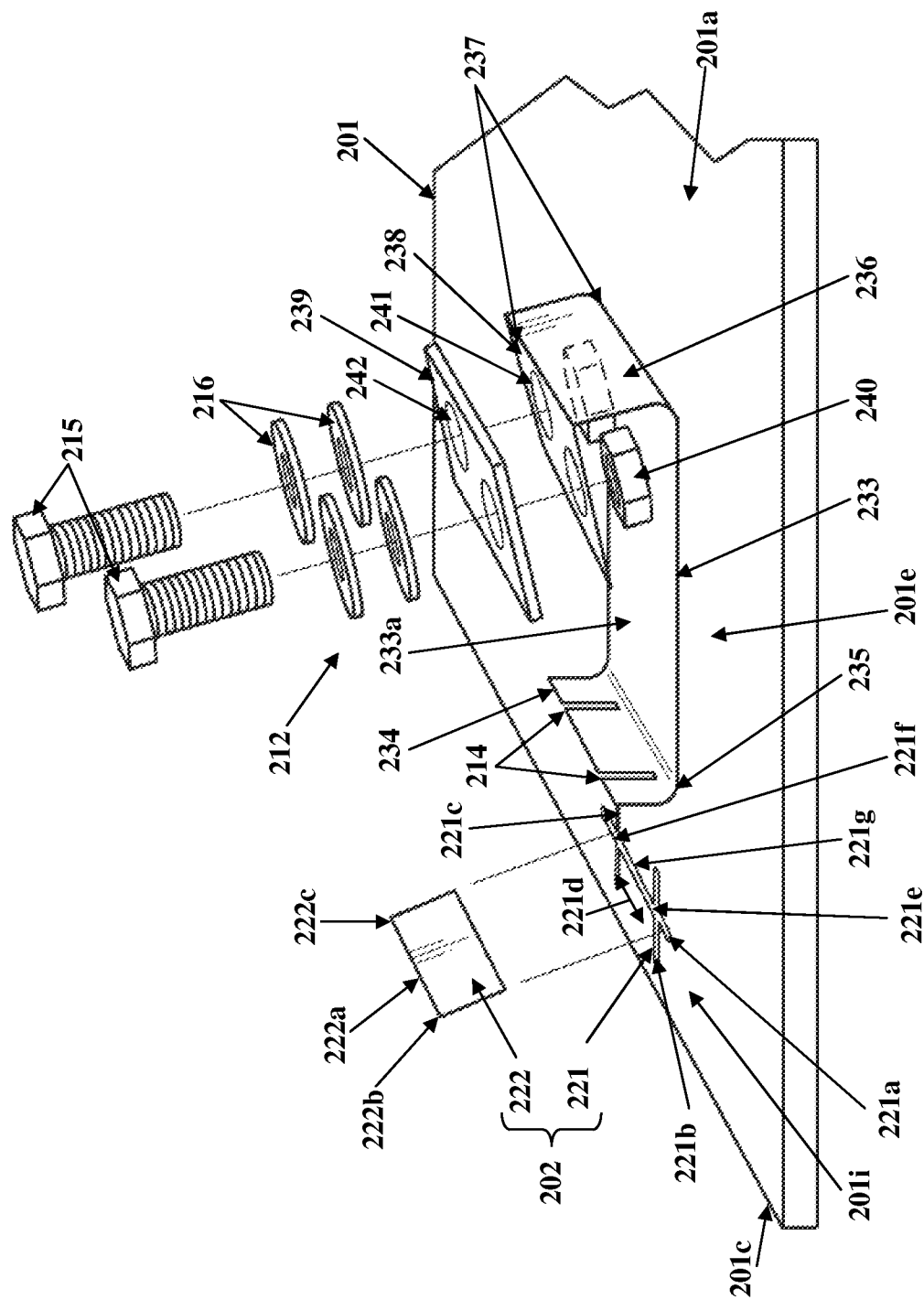
FIGS. 7A-7B exemplarily illustrate exploded views of second objects, for example, constrained assemblies positioned at opposing sections on a rear surface of a first object.
Figure 7B:
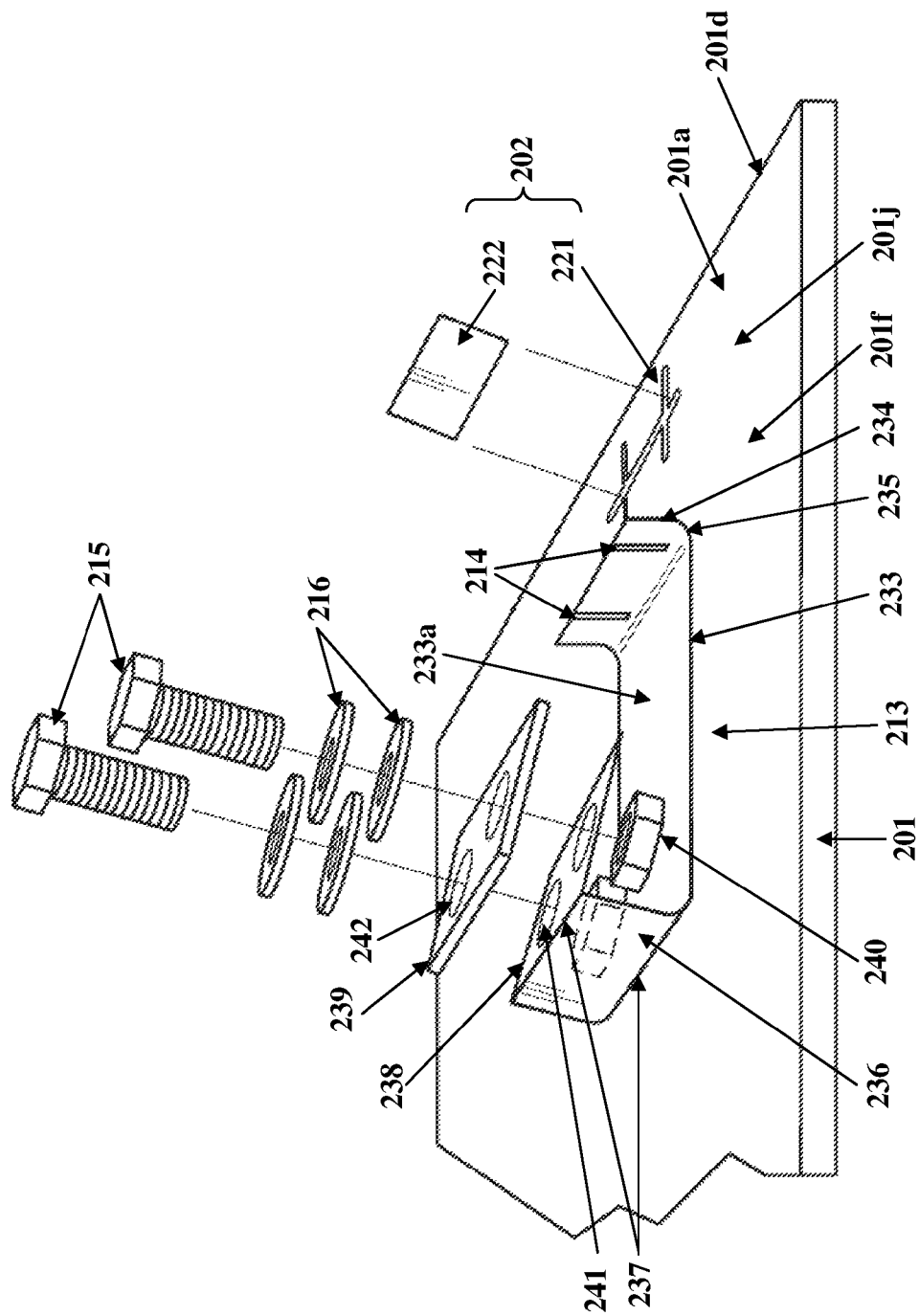

FIGS. 7A-7B exemplarily illustrate exploded views of second objects, for example, the constrained assemblies 212 and 213 positioned at opposing sections 201e and 201f on a rear surface 201a of a first object 201. Each of the constrained assemblies 212 and 213 comprises a flanged element 233, bolt members 215, washers 216, and nuts 240. The flanged element 233 comprises a first flanged end 234 and a second flanged end 236 opposing the first flanged end 234. The flanged element 233 is configured to avoid lateral movement and/or vertical movement of each of the constrained assemblies 212 and 213, thereby increasing structural integrity of each of the constrained assemblies 212 and 213. Addition of the flanged element 233 in each of the constrained assemblies 212 and 213 avoids lateral displacement of each of the constrained assemblies 212 and 213 due to bending of the tension bearing members 210 and 211 respectively, exemplarily illustrated in FIG. 4A, or vertical displacement of each of the constrained assemblies 212 and 213 due to sliding of the constrained assemblies 212 and 213 along the tension bearing members 210 and 211 respectively.

As exemplarily illustrated in FIGS. 7A-7B, the first flanged end 234 of the flanged element 233 comprises two orifices 214 cut into the first flanged end 234. The first flanged end 234 of the flanged element 233 is defined by a single bend 235. The second flanged end 236 of the flanged element 233 of each of the constrained assemblies 212 and 213 is defined by a double bend 237. The double bend 237 comprises a plate section 238 inclined at a predefined angle with respect to an upper surface 233a of the flanged element 233. The angle of inclination is, for example, within a range of about 0 degrees to about 5 degrees. The double bend 237 is positioned, for example, at about 90 degrees to the upper surface 233a of the flanged element 233. A support plate 239 is positioned above the plate section 238 and fastened to the plate section 238 using the bolt members 215, the washers 216, and the nuts 240. The washers 216 distribute load of the bolt members 215. The plate section 238 and the support plate 239 of the second flanged end 236 of the flanged element 233 comprise through holes 241 and 242 respectively, configured to receive the bolt members 215. The bolt members 215 are fastened by the nuts 240 positioned below the plate section 238. The bolt members 215 are supported by the washers 216 and the support plate 239 positioned above the plate section 238.

As exemplarily illustrated in FIGS. 7A-7B, the anchoring element 202 comprises the grooves 221 and the attachment element 222 inserted into the grooves 221. In an embodiment, the grooves 221 comprise a linear groove 221a and at least two parallel intersecting grooves 221b and 221c. The parallel intersecting grooves 221b and 221c intersect with the linear groove 221a to define at least two intersection junctions 221e and 221f as exemplarily illustrated in FIG. 7A. The grooves 221 are a set of three grooves 221a, 221b, and 221c configured to form a C shaped groove as exemplarily illustrated in FIGS. 7A-7B. The grooves 221 are created at locations 201i and 201j proximal to the opposing ends 201c and 201d of the first object 201 respectively, on the rear surface 201a of the first object 201 as exemplarily illustrated in FIGS. 7A-7B. The attachment element 222 inserted into one of the grooves 221, for example, the linear groove 221a prevents the tension bearing members 210 and 211 from cracking the rear surface 201a of the first object 201 and damaging the grooves 221 on the opposing sections 201e and 201f of the first object 201. In an embodiment, the attachment element 222 is of a length longer than a region 221d defined between the intersection junctions 221e and 221f created by an intersection of the parallel intersecting grooves 221b and 221c with the linear groove 221a as exemplarily illustrated in FIGS. 7A-7B and FIG. 8, for distributing the load uniformly across a center section 221g of the grooves 221 to preclude damage to the grooves 221 on the rear surface 201a of the first object 201. For example, the length of the attachment element 222 is about 1/16 inches, that is, about 1.6 millimeters (mm) longer than the region 221d defined between the intersection junctions 221e and 221f. A center section 222a of the attachment element 222 is aligned with the center section 221g of the grooves 221 such that the opposing edges 222b and 222c of the attachment element 222 exemplarily illustrated in FIG. 7A, overhang the region 221d defined between the intersection junctions 221e and 221f by about ⅟₃₂ inches, that is, about 0.8 mm.

Figure 8:
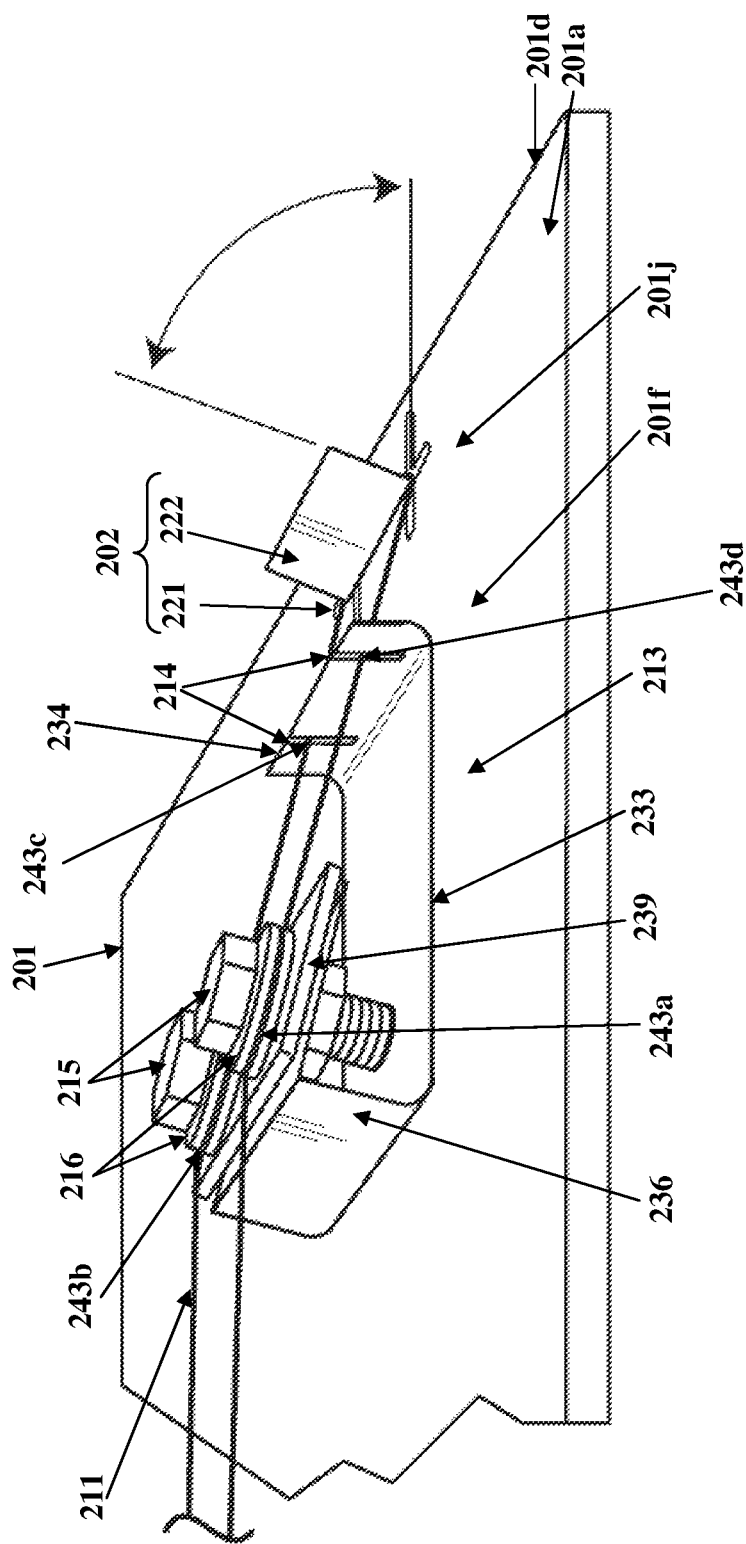
FIG. 8 exemplarily illustrates a partial side perspective view of a second object, for example, a constrained assembly positioned at an opposing section on a rear surface of a first object.

FIG. 8 exemplarily illustrates a partial side perspective view of a second object, for example, the constrained assembly 213 positioned at an opposing section 201f on a rear surface 201a of a first object 201. As exemplarily illustrated in FIG. 8, the anchoring element 202 comprises the grooves 221 and the attachment element 222 inserted into the grooves 221. The grooves 221 are created at a location 201j proximal to the opposing end 201d on the rear surface 201a of the first object 201. The grooves 221 are cut into the first object 201 at a predefined angle, for example, of about 45 degrees to allow insertion of the attachment element 222 into the grooves 221 at the predefined angle to the rear surface 201a of the first object 201. The predefined angle can be within a range of, for example, about 30 degrees to about 45 degrees. The attachment element 222 that is inserted into the grooves 221 prevents the tension bearing member 211 from cracking the rear surface 201a of the first object 201 and damaging the grooves 221 on the opposing section 201f of the first object 201.

As exemplarily illustrated in FIG. 8, the tension bearing member 211 loops around the attachment element 222 and connects to the tension assembly 204 or 227 as exemplarily illustrated in FIG. 4A and FIG. 6A. The constrained assembly 213 is positioned underneath the tension bearing member 211 such that the tension bearing member 211 passes through the orifices 214 of the constrained assembly 213. The constrained assembly 213 comprises a flanged element 233 and one or more bolt members 215 as disclosed in the detailed description of FIGS. 7A-7B. The orifices 214 in the first flanged end 234 of the flanged element 233 of the constrained assembly 213 receive the tension bearing member 211 extending from the anchoring element 202, that is, the attachment element 222, positioned at the opposing section 201f of the first object 201. The bolt members 215 and the washers 216 are fastened on the second flanged end 236 of the flanged element 233. The extended tension bearing member 211 is sandwiched and clamped between the bolt members 215 and the washers 216 of the constrained assembly 213 under the tension generated by the tension assembly 204 or 227.

The constrained assembly 213 is constrained by the tension bearing member 211 on the opposing section 201f on the rear surface 201a of the first object 201. FIG. 8 exemplarily illustrates the constrained assembly 213 constrained by the tension bearing member 211 at four contact points 243a, 243b, 243c, and 243d. As used herein, "contact point" refers to a region of contact where a tension bearing member, for example, 211 contacts a surface of the constrained assembly, for example, 213 for constraining the constrained assembly 213, for example, to a rear surface 201a of a first object 201. The bolt members 215 are configured to tighten the tension bearing member 211 to prevent rotation and lateral movement of the constrained assembly 213 on the rear surface 201a of the first object 201. The bolt members 215 are tightened to squeeze and press the tension bearing member 211 against the flanged element 233 of the constrained assembly 213. The friction developed from tightening the bolt members 215 prevents the flanged element 233 from being displaced along the tension bearing member 211. The orifices 214 of the first flanged end 234 of the flanged element 233 and the bolt members 215 of the constrained assembly 213 prevent rotation and lateral movement of the constrained assembly 213 with respect to the first object 201. The tension bearing member 211 is sandwiched between the bolt members 215 and the support plate 239 as exemplarily illustrated in FIG. 8. The friction force developed by the tightening of the bolt members 215 on the tension bearing member 211 is sufficient to restrain the constrained assembly 213 on the first object 201. In an embodiment, the bolt members 215 are not disposed on the second flanged end 236 of the flanged element 233, as the friction force developed by the tightening of the bolt members 215 on the tension bearing members 211 is not required for restraining the constrained assembly 213 on the first object 201 as exemplarily illustrated in FIG. 11.

Figure 9:
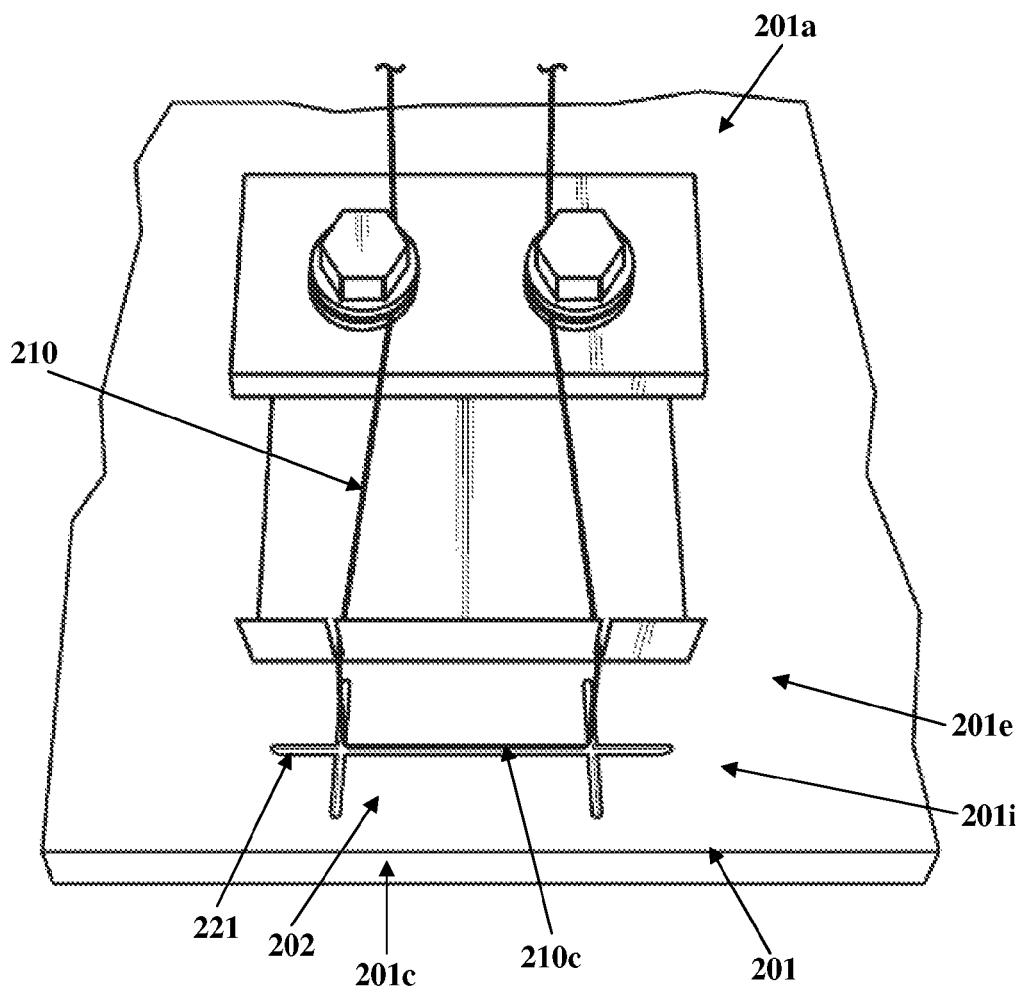
FIG. 9 exemplarily illustrates a partial front perspective view showing an embodiment of an anchoring element of the attachment apparatus.

FIG. 9 exemplarily illustrates a partial front perspective view showing an embodiment of an anchoring element 202 of the attachment apparatus 200 exemplarily illustrated in FIG. 4A. In this embodiment, the anchoring element 202 is a set of grooves 221 of a predefined shape, for example, a C shape positioned at a location 201i proximal to the opposing end 201c of the first object 201, on the rear surface 201a of the first object 201. In this embodiment, the tension bearing member 210 is configured as a wire loop 210c that is wrapped around the C shaped groove 221 similar to a pulley. As exemplarily illustrated in FIG. 9, the grooves 221 are created at a predefined angle at a location 201i proximal to the opposing end 201c of the first object 201. In an embodiment, the tension bearing member 210 is connected to the opposing section 201e on the rear surface 201a of the first object 201 by inserting a loop 210c of the tension bearing member 210 into the grooves 221.

Figure 10:
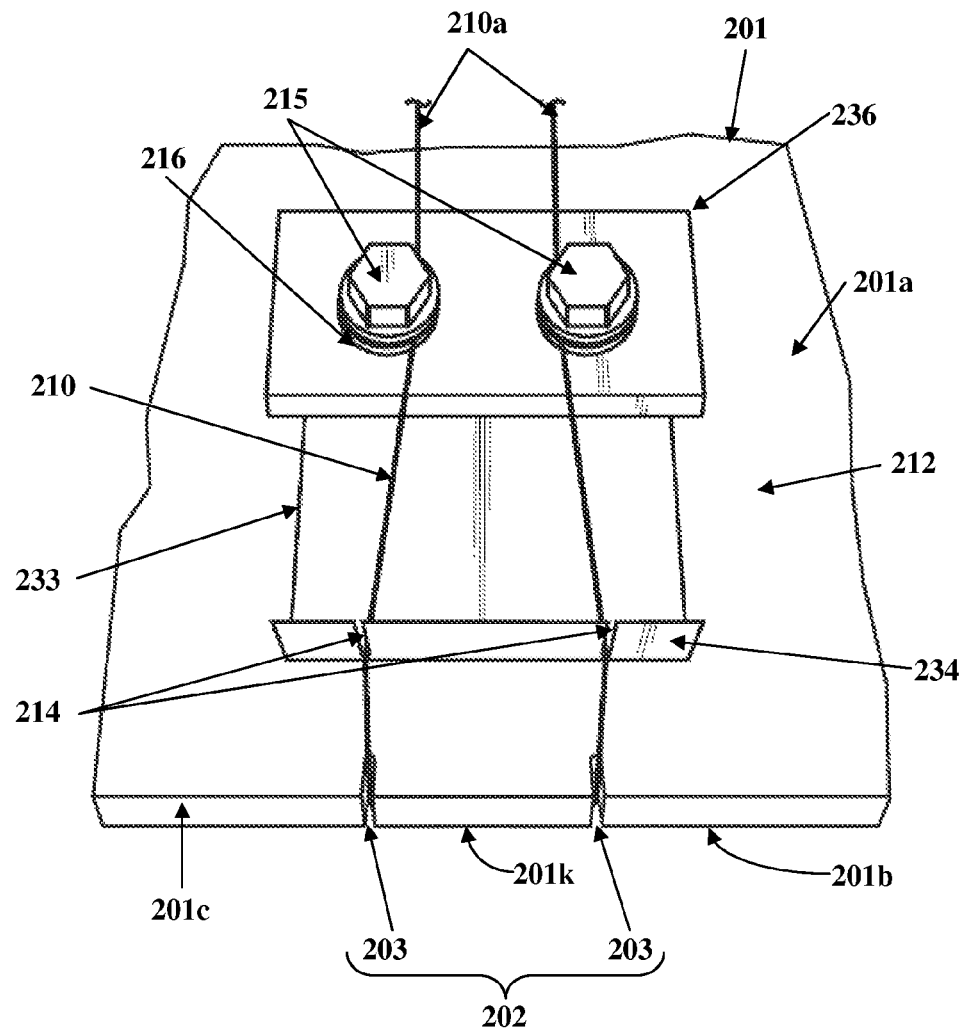
FIG. 10 exemplarily illustrates a partial front perspective view showing another embodiment of the anchoring element of the attachment apparatus.

FIG. 10 exemplarily illustrates a partial front perspective view showing another embodiment of the anchoring element 202 of the attachment apparatus 200 exemplarily illustrated in FIG. 4A. In this embodiment, the anchoring element 202 comprises grooves 203 created on the opposing end 201c of the first object 201. The grooves 203 are configured as a set of paired vertical grooves cut into the opposing end 201c of the first object 201 as exemplarily illustrated in FIG. 10. In this embodiment, the tension bearing member 210 is configured as a wire loop that is wrapped around the grooves 203 similar to a pulley. As exemplarily illustrated in FIG. 10, the constrained assembly 212 comprises the flanged element 233 and the bolt members 215. The flanged element 233 comprises a first flanged end 234 comprising the orifices 214 cut into the first flanged end 234 and a second flanged end 236 opposing the first flanged end 234. In an embodiment, the tension bearing member 210 is extended from the grooves 203, through the orifices 214 of the first flanged end 234 of the flanged element 233, and wound under a tension around the bolt members 215 that are fastened on the second flanged end 236 of the flanged element 233.

As exemplarily illustrated in FIG. 10, the grooves 203 are cut perpendicular to the opposing end 201c of the first object 201. The tension bearing member 210 is anchored to the first object 201 via the grooves 203. The tension bearing member 210 is wrapped around a portion 201k of the front surface 201b of the first object 201 via the grooves 203 and extended towards the constrained assembly 212 on the rear surface 201a of the first object 201. The tension bearing member 210 inserted into the grooves 203 can be used for mounting multiple items comprising, for example, a bracket, a handle, etc., on the front surface 201b of the first object 201 as exemplarily illustrated in FIGS. 2A-2C and as disclosed in the detailed description of FIGS. 2A-2C.

As exemplarily illustrated in FIGS. 9-10, the anchoring element 202 comprises only the grooves 221 or 203 of a predefined shape. Grooves 203 or 221 of various shapes can be created in the first object 201 to allow many variations in groove shapes, the tension bearing members 210 and 211, or variations in a second object, for example, 217 such as a bracket type object exemplarily illustrated in FIGS. 2A-2C, or a tile to be attached to the first object 201, in each embodiment of the method of attaching objects, for example, 201, 212, 213, and 217 made of dissimilar materials.

FIG. 11 exemplarily illustrates a partial side perspective view of an embodiment of a second object, for example, the constrained assembly 212, showing a portion 236a of a second flanged end 236 of a flanged element 233 of the constrained assembly 212 extending into a channel 245 created in a first object 201. In this embodiment, the constrained assembly 212 positioned on the opposing section 201e of the rear surface 201a of the first object 201 comprises the flanged element 233. The flanged element 233 comprises a first flanged end 234 and a second flanged end 236 opposing the first flanged end 234. In an embodiment, the portion 236a of the second flanged end 236 of the constrained assembly 212 is configured as a tab extending into the channel 245 as exemplarily illustrated in FIG. 11. The channel 245 cut into the first object 201 acts as a geometrical constraint and constrains the portion 236a of the second flanged end 236 of the flanged element 233 extended and engaged into the channel 245. The portion 236a of the second flanged end 236 of the flanged element 233 of the constrained assembly 212 is engaged in the channel 245 to constrain the constrained assembly 212 from lateral movements on the rear surface 201a of the first object 201. The constraint provided by the portion 236a of the second flanged end 236 prevents the constrained assembly 212 from sliding along the tension bearing member 210.

Furthermore, in this embodiment as exemplarily illustrated in FIG. 11, the flanged ends 234 and 236 of the flanged element 233 of the constrained assembly 212 comprise orifices 214 and 244 cut into the flanged ends 234 and 236 respectively. The orifices 214 and 244 of the flanged ends 234 and 236 of the flanged element 233 respectively, are configured to receive the tension bearing member 210 extending from the anchoring element 202 positioned at the opposing section 201e of the first object 201, when the constrained assembly 212 is positioned underneath the tension bearing member 210 that is connected to the tension assembly 204 or 227 as exemplarily illustrated in FIG. 4A and FIG. 6A. In an embodiment, a support flange 246 is fixedly attached to a side edge 233b of the flanged element 233 of the constrained assembly 212. The function of the support flange 246 is disclosed in the detailed description of FIG. 12.

In the embodiment exemplarily illustrated in FIG. 11, the tension bearing member 210 is tensioned by the tension assembly 204 or 227, and the constrained assembly 212 is pushed under the tension bearing member 210 until the portion 236a of the second flanged end 236 of the flanged element 233 engages the channel 245. The portion 236a of the second flanged end 236 of the flanged element 233 engaged in the channel 245 prevents the constrained assembly 212, for example, from sliding along the tension bearing member 210, displacing from the channel 245, moving laterally, or rotating with respect to the tension bearing member 210 due to the wire tension generated in the tension bearing member 210.

FIG. 12 exemplarily illustrates a side perspective view of an embodiment of a second object, for example, the constrained assembly 213, showing a support flange 246 extending from a side edge 233b of the flanged element 233 of the constrained assembly 213. The support flange 246 is used to attach a first object 201 exemplarily illustrated in FIG. 11, to an adjacent first object. For example, the support flange 246 can be used to attach two adjacent tiles to each other. The support flange 246 is an arbitrary part fixedly attached to the side edge 233b of the flanged element 233 of the constrained assembly 213, which can be used to facilitate external attachments of an adjacent first object to the rear surface 201a of the first object 201 exemplarily illustrated in FIG. 11. The support flange 246 is configured to operably attach to an adjacent support flange (not shown) of an adjacent constrained assembly (not shown) positioned on an adjacent rear surface (not shown) of an adjacent first object (not shown). In an example, the support flange 246 operably attaches to another support flange assembled on another first object for attaching the first object 201 and the other first object together. To attach a first object 201 to another first object using the support flange 246, the support flange 246 of the constrained assembly 213 has to be attached to another support flange on the other first object that is a mirror image of this support flange 246. The overhanging sections, hereinafter referred to as "rear surfaces" 246a of the support flange 246 on the first object 201 and the adjacent first object overlap with each other to allow the first object 201 and the adjacent first object to be mechanically attached, for example, welded to each other.

The foregoing examples have been provided merely for the purpose of explanation and are in no way to be construed as limiting of the method and the attachment apparatus 200 exemplarily illustrated in FIG. 2A, FIG. 3, FIG. 4A, and FIG. 6A, disclosed herein. While the method and the attachment apparatus 200 have been described with reference to various embodiments, it is understood that the words, which have been used herein, are words of description and illustration, rather than words of limitation. Further, although the method and the attachment apparatus 200 have been described herein with reference to particular means, materials, and embodiments, the method and the attachment apparatus 200 are not intended to be limited to the particulars disclosed herein; rather, the method and the attachment apparatus 200 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the attachment apparatus 200 disclosed herein in their aspects.

I claim:

1. A method for attaching a first object made of a first material to one or more second objects made of a plurality of second materials dissimilar from said first material of said first object without any bonding material, said method comprising:
  positioning anchoring elements at opposing sections of said first object made of said first material, wherein said anchoring elements are configured to anchor at least two tension bearing members on said first object;
  connecting one or more of said at least two tension bearing members to said one or more second objects made of said second materials dissimilar to said first material of said first object, positioned at one or more of said opposing sections on one or more of a front surface and a rear surface of said first object, via said anchoring elements; and
  extending said at least two tension bearing members at said opposing sections on said rear surface of said first object and operably connecting front ends of said extended at least two tension bearing members to a tension assembly positioned substantially at a midsection between said opposing sections on said rear surface of said first object, wherein said tension assembly is configured to operably connect said extended at least two tension bearing members to generate a tension in said extended at least two tension bearing members, thereby attaching said one or more of said front surface and said rear surface of said first object made of said first material to said one or more second objects made of said second materials dissimilar to said first material of said first object without said any bonding material.

2. The method of claim 1, wherein said anchoring elements are positioned on one of opposing ends of said first object and locations proximal to said opposing ends on said rear surface of said first object.

3. The method of claim 1, wherein said anchoring elements comprise grooves created on one of opposing ends of said first object and locations proximal to said opposing ends on said rear surface of said first object.

4. The method of claim 1, wherein said anchoring elements comprise:
   grooves created at locations proximal to opposing ends on said rear surface of said first object; and
   an attachment element inserted into one of said grooves, wherein said attachment element is configured to distribute a load caused by said tension of said extended at least two tension bearing members.

5. The method of claim 4, wherein said grooves comprise a linear groove and at least two parallel intersecting grooves, wherein said at least two parallel intersecting grooves intersect with said linear groove to define at least two intersection junctions.

6. The method of claim 4, wherein said attachment element is of a length longer than a region defined between said at least two intersection junctions created by an intersection of at least two parallel intersecting grooves with a linear groove of said grooves for distributing said load uniformly across said grooves to preclude damage to said grooves on said rear surface of said first object.

7. The method of claim 1, further comprising positioning said one or more second objects comprising a set of constrained assemblies at said opposing sections on said rear surface of said first object, below said at least two tension bearing members extending from said anchoring elements positioned at said opposing sections of said first object and constraining said constrained assemblies by said extended at least two tension bearing members, wherein each of said constrained assemblies comprises:
   a flanged element comprising a first flanged end and a second flanged end opposing said first flanged end, said first flanged end comprising orifices cut into said first flanged end, said orifices of said first flanged end configured to receive one of said at least two tension bearing members extending from said anchoring elements positioned at one of said opposing sections of said first object; and
   one or more bolt members and one or more washers fastened on said second flanged end of said flanged element, wherein said one of said extended at least two tension bearing members is sandwiched and clamped between said one or more bolt members and said one or more washers under said tension.

8. The method of claim 7, wherein said first flanged end of said flanged element of said each of said constrained assemblies is defined by a single bend.

9. The method of claim 7, wherein said second flanged end of said flanged element of said each of said constrained assemblies is defined by a double bend, wherein said double bend comprises a plate section inclined at a predefined angle with respect to an upper surface of said flanged element.

10. The method of claim 9, wherein said plate section of said second flanged end of said flanged element comprises one or more through holes configured to receive one or more bolt members, wherein said one or more bolt members are configured to be fastened by one or more nuts positioned below said plate section.

11. The method of claim 1, further comprising positioning said one or more second objects comprising a set of constrained assemblies at said opposing sections on said rear surface of said first object, below said at least two tension bearing members extending from said anchoring elements positioned at said opposing sections of said first object and constraining said constrained assemblies by said extended at least two tension bearing members, wherein each of said constrained assemblies comprises a flanged element comprising a first flanged end and a second flanged end opposing said first flanged end, wherein said first flanged end and said second flanged end of said flanged element comprise orifices cut into said first flanged end and said second flanged end, wherein said orifices of said first flanged end and said second flanged end are configured to receive one of said at least two tension bearing members extending from said anchoring elements positioned at one of said opposing sections of said first object.

12. The method of claim 11, wherein a portion of said each of said constrained assemblies is configured to extend into a channel created in said first object, and wherein said portion of said each of said constrained assemblies is engaged in said channel to constrain said each of said constrained assemblies from lateral movements on said rear surface of said first object.

13. The method of claim 1, wherein said tension assembly comprises:
   a threaded rod; and
   at least two nuts threadably engaged to opposing ends of said threaded rod, wherein said at least two nuts are tightened to generate said tension in said extended at least two tension bearing members.

14. The method of claim 1, wherein said tension assembly comprises at least two inwardly bent members slidably engaged with each other, wherein each of said at least two inwardly bent members comprises:
   a central section comprising through holes configured to receive said front ends of each of said extended at least two tension bearing members; and
   wall sections extending perpendicularly from opposing ends of said central section to define a space therewithin, wherein said wall sections of one of said at least two inwardly bent members are configured to slidably engage with said wall sections of another of said at least two inwardly bent members, within said space defined by said wall sections of said another of said at least two inwardly bent members.

15. The method of claim 1, further comprising attaching a support flange to a side edge of a flanged element of each of a set of constrained assemblies positioned at said opposing sections on said rear surface of said first object and constrained by said at least two tension bearing members extending from said anchoring elements positioned at said opposing sections of said first object, wherein said support flange is configured to operably attach to an adjacent support flange of an adjacent constrained assembly positioned on an adjacent rear surface of an adjacent first object.

16. The method of claim 1, wherein said one or more second objects made of said second materials comprise one or more of a set of constrained assemblies positioned at said opposing sections on said rear surface of said first object and a supplementary object positioned on said front surface of said first object, wherein said supplementary object is selected from the group consisting of a hinge, a bracket, a handle, and combinations thereof.

17. The method of claim 1, wherein said first object has a constant surface geometry.

18. An attachment apparatus for attaching a first object made of a first material to one or more second objects made of a plurality of second materials dissimilar from said first material of said first object without any bonding material, said attachment apparatus comprising:
   anchoring elements positioned at opposing sections of said first object made of said first material, wherein said anchoring elements are configured to anchor at least two tension bearing members on said first object;
   one or more of said at least two tension bearing members configured to connect to said one or more second objects made of said second materials dissimilar to said first material of said first object, positioned at one or more of said opposing sections on one or more of a front surface and a rear surface of said first object, via said anchoring elements; and
   a tension assembly positioned substantially at a mid-section between said opposing sections on said rear surface of said first object and operably connected to front ends of said at least two tension bearing members extending at said opposing sections on said rear surface of said first object, wherein said tension assembly is configured to generate a tension in said extended at least two tension bearing members, thereby attaching said one or more of said front surface and said rear surface of said first object made of said first material to said one or more second objects made of said second materials dissimilar to said first material of said first object without said any bonding material.

19. The attachment apparatus of claim 18, wherein said anchoring elements are positioned on one of opposing ends of said first object and locations proximal to said opposing ends on said rear surface of said first object.

20. The attachment apparatus of claim 18, wherein said anchoring elements comprise grooves created on one of opposing ends of said first object and locations proximal to said opposing ends on said rear surface of said first object.

21. The attachment apparatus of claim 18, wherein said anchoring elements comprise:
   grooves created at locations proximal to opposing ends on said rear surface of said first object; and
   an attachment element inserted into one of said grooves, wherein said attachment element is configured to distribute a load caused by said tension of said extended at least two tension bearing members.

22. The attachment apparatus of claim 21, wherein said grooves comprise a linear groove and at least two parallel intersecting grooves, wherein said at least two parallel intersecting grooves intersect with said linear groove to define at least two intersection junctions.

23. The attachment apparatus of claim 21, wherein said attachment element is of a length longer than a region defined between said at least two intersection junctions created by an intersection of at least two parallel intersecting grooves with a linear groove of said grooves for distributing said load uniformly across said grooves to preclude damage to said grooves on said rear surface of said first object.

24. The attachment apparatus of claim 18, wherein said one or more second objects comprise a set of constrained assemblies positioned at said opposing sections on said rear surface of said first object, below said at least two tension bearing members extending from said anchoring elements positioned at said opposing sections of said first object and constrained by said extended at least two tension bearing members, wherein each of said constrained assemblies comprises:
   a flanged element comprising a first flanged end and a second flanged end opposing said first flanged end, said first flanged end comprising orifices cut into said first flanged end, said orifices of said first flanged end configured to receive one of said at least two tension bearing members extending from said anchoring elements positioned at one of said opposing sections of said first object; and
   one or more bolt members and one or more washers fastened on said second flanged end of said flanged element, wherein said one of said extended at least two tension bearing members is sandwiched and clamped between said one or more bolt members and said one or more washers under said tension.

25. The attachment apparatus of claim 24, wherein said first flanged end of said flanged element of said each of said constrained assemblies is defined by a single bend.

26. The attachment apparatus of claim 24, wherein said second flanged end of said flanged element of said each of said constrained assemblies is defined by a double bend, wherein said double bend comprises a plate section inclined at a predefined angle with respect to an upper surface of said flanged element.

27. The attachment apparatus of claim 26, wherein said plate section of said second flanged end of said flanged element comprises one or more through holes configured to receive one or more bolt members, wherein said one or more bolt members are configured to be fastened by one or more nuts positioned below said plate section.

28. The attachment apparatus of claim 18, further comprising positioning said one or more second objects comprising a set of constrained assemblies at said opposing sections on said rear surface of said first object, below said at least two tension bearing members extending from said anchoring elements positioned at said opposing sections of said first object and constraining said constrained assemblies by said extended at least two tension bearing members, wherein each of said constrained assemblies comprises a flanged element comprising a first flanged end and a second flanged end opposing said first flanged end, wherein said first flanged end and said second flanged end of said flanged element comprise orifices cut into said first flanged end and said second flanged end, wherein said orifices of said first flanged end and said second flanged end are configured to receive one of said at least two tension bearing members extending from said anchoring elements positioned at one of said opposing sections of said first object.

29. The attachment apparatus of claim 28, wherein a portion of said each of said constrained assemblies is configured to extend into a channel created in said first object, and wherein said portion of said each of said constrained assemblies is engaged in said channel to constrain said each of said constrained assemblies from lateral movements on said rear surface of said first object.

30. The attachment apparatus of claim 18, wherein said tension assembly comprises:

a threaded rod; and at least two nuts threadably engaged to opposing ends of said threaded rod, wherein said at least two nuts are tightened to generate said tension in said extended at least two tension bearing members.

31. The attachment apparatus of claim 18, wherein said tension assembly comprises at least two inwardly bent members slidably engaged with each other, wherein each of said at least two inwardly bent members comprises:

a central section comprising through holes configured to receive said front ends of each of said extended at least two tension bearing members; and wall sections extending perpendicularly from opposing ends of said central section to define a space therewithin, wherein said wall sections of one of said at least two inwardly bent members are configured to slidably engage with said wall sections of another of said at least two inwardly bent members, within said space defined by said wall sections of said another of said at least two inwardly bent members.

32. The attachment apparatus of claim 18, further comprising a support flange extending from a side edge of a flanged element of each of a set of constrained assemblies positioned at said opposing sections on said rear surface of said first object and constrained by said at least two tension bearing members extending from said anchoring elements positioned at said opposing sections of said first object, wherein said support flange is configured to operably attach to an adjacent support flange of an adjacent constrained assembly positioned on an adjacent rear surface of an adjacent first object.

33. The attachment apparatus of claim 18, wherein said one or more second objects made of said second materials comprise one or more of a set of constrained assemblies positioned at said opposing sections on said rear surface of said first object and a supplementary object positioned on said front surface of said first object, wherein said supplementary object is selected from the group consisting of a hinge, a bracket, a handle, and combinations thereof.

34. The attachment apparatus of claim 18, wherein said first object has a constant surface geometry.

* * * * *